US009689612B2

(12) United States Patent
Gangoli et al.

(10) Patent No.: US 9,689,612 B2
(45) Date of Patent: *Jun. 27, 2017

(54) SELECTIVE OXY-FUEL BURNER AND METHOD FOR A ROTARY FURNACE

(71) Applicant: AIR PRODUCTS AND CHEMICALS, INC., Allentown, PA (US)

(72) Inventors: Shailesh Pradeep Gangoli, Easton, PA (US); J. Bruce Kenworthy, Franklin, TN (US); Russell James Hewertson, Wescosville, PA (US); Anup Vasant Sane, Allentown, PA (US); Reed Jacob Hendershot, Orefield, PA (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/721,342

(22) Filed: May 26, 2015

(65) Prior Publication Data

US 2016/0348970 A1    Dec. 1, 2016

(51) Int. Cl.
*F23C 5/08* (2006.01)
*F27B 7/34* (2006.01)
(Continued)

(52) U.S. Cl.
CPC ............. *F27B 7/34* (2013.01); *F23C 5/08* (2013.01); *F23C 6/02* (2013.01); *F23D 14/46* (2013.01);
(Continued)

(58) Field of Classification Search
CPC ............. F27B 7/34; F23L 7/007; F23N 1/002
(Continued)

(56) References Cited

U.S. PATENT DOCUMENTS 5,554,022 A    9/1996 Nabors, Jr. et al.
6,079,229 A *  6/2000 Legiret .................. C03B 5/235
                                                              431/8

(Continued)

FOREIGN PATENT DOCUMENTS

EP    2290310    3/2011
EP    2913586    9/2015

OTHER PUBLICATIONS

Sane, Anup Vasant, U.S. Appl. No. 14/193,698, entitled "Transient Heating Burner and Method", filed Feb. 28, 2014.

*Primary Examiner* — Gregory Huson
*Assistant Examiner* — Nikhil Mashruwala
(74) *Attorney, Agent, or Firm* — Larry S. Zelson

(57) ABSTRACT

A selective oxy-fuel burner for mounting in a charge door of a rotary furnace, including at least two burner elements each oriented to fire into different portions of the furnace, each burner element including a selective distribution nozzle configured to flow a first reactant; and a proportional distribution nozzle configured to flow a second reactant; at least one sensor to detect one or more process parameters related to furnace operation; and a controller programmed to independently control the first reactant flow to each selective distribution nozzle based on the detected process parameters such that at least one burner element is active and at least one burner element is passive; wherein the second reactant is substantially proportionally distributed to the proportional distribution nozzles; and wherein the first reactant is one of a fuel and an oxidant and wherein the second reactant is the other of a fuel and an oxidant.

15 Claims, 26 Drawing Sheets

(51) Int. Cl.

| | | |
|---|---|---|
| *F23L 7/00* | (2006.01) | |
| *F23N 1/00* | (2006.01) | |
| *F23N 3/00* | (2006.01) | |
| *F23N 5/00* | (2006.01) | |
| *F23N 5/08* | (2006.01) | |
| *F23N 5/10* | (2006.01) | |
| *F23N 5/24* | (2006.01) | |
| *F23C 6/02* | (2006.01) | |
| *F23G 5/20* | (2006.01) | |
| *F23D 14/46* | (2006.01) | |
| *F27B 7/20* | (2006.01) | |
| *F27B 7/10* | (2006.01) | |
| *F27B 7/42* | (2006.01) | |
| *F27D 21/00* | (2006.01) | |
| *F27D 99/00* | (2010.01) | |
| *F27D 19/00* | (2006.01) | |

(52) U.S. Cl.
 CPC ............ *F23G 5/20* (2013.01); *F23L 7/007* (2013.01); *F23N 1/002* (2013.01); *F23N 3/002* (2013.01); *F23N 5/003* (2013.01); *F23N 5/08* (2013.01); *F23N 5/10* (2013.01); *F23N 5/24* (2013.01); *F23N 5/242* (2013.01); *F27B 7/10* (2013.01); *F27B 7/20* (2013.01); *F27B 7/42* (2013.01); *F27D 21/0014* (2013.01); *F27D 99/0033* (2013.01); *F23C 2201/20* (2013.01); *F23C 2900/05081* (2013.01); *F27D 2019/0006* (2013.01); *F27D 2019/0021* (2013.01)

(58) Field of Classification Search
 USPC ................................ 431/76, 9, 10; 110/261
 See application file for complete search history.

(56) References Cited

U.S. PATENT DOCUMENTS

| | | | |
|---|---|---|---|
| 6,113,389 A * | 9/2000 | Joshi | C03B 5/2353 431/11 |
| 6,126,440 A * | 10/2000 | Argent | C03B 5/2353 110/347 |
| 6,519,973 B1 * | 2/2003 | Hoke, Jr. | C03B 5/235 110/297 |
| 6,866,503 B2 | 3/2005 | Ladharam | |
| 8,851,883 B2 * | 10/2014 | Jarry | C03B 5/2353 126/99 R |
| 8,915,733 B2 | 12/2014 | Cao et al. | |
| 9,206,979 B2 * | 12/2015 | Cole | F23C 5/28 |
| 2003/0054301 A1 * | 3/2003 | Borders | F23D 14/22 431/8 |
| 2010/0077944 A1 * | 4/2010 | Slavejkov | F23C 6/04 110/345 |
| 2013/0095437 A1 | 4/2013 | Buragino et al. | |
| 2013/0143168 A1 | 6/2013 | Gangoli et al. | |
| 2013/0307202 A1 | 11/2013 | Hegenberg et al. | |

* cited by examiner

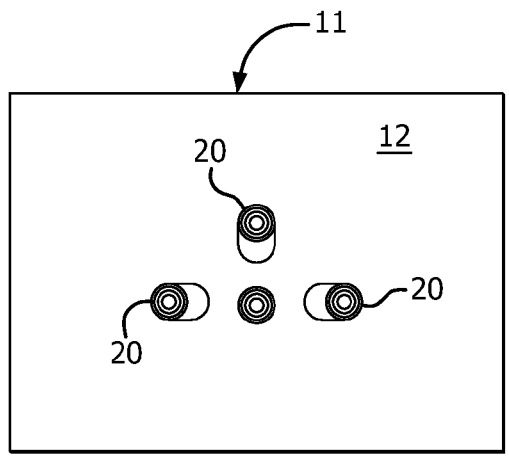
FIG. 5C (a)
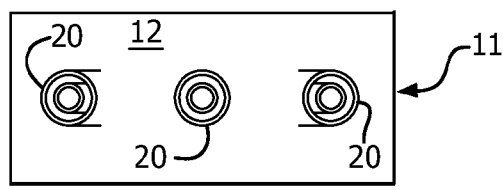
FIG. 5C (b)
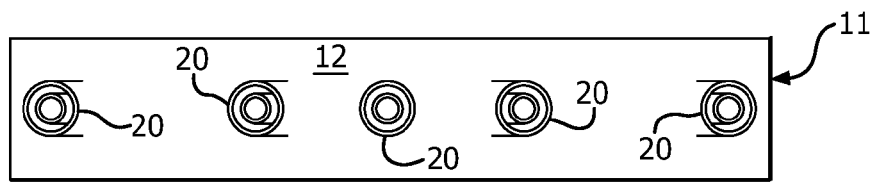
FIG. 5C (c)
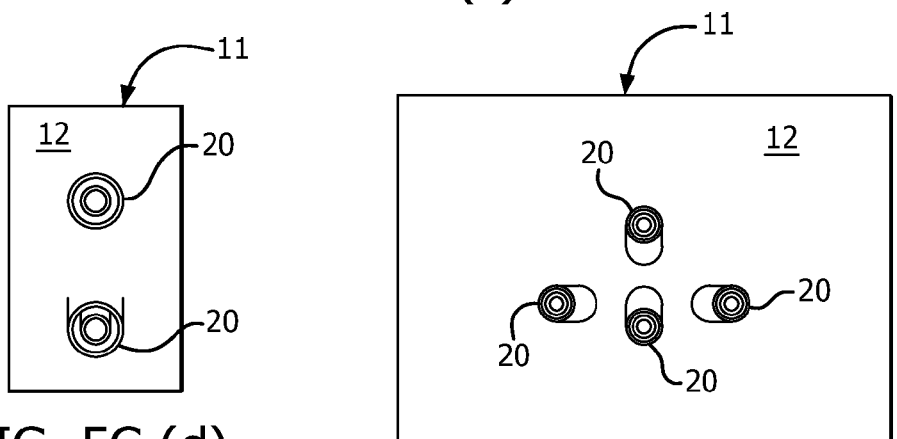
FIG. 5C (d)
FIG. 5C (e)

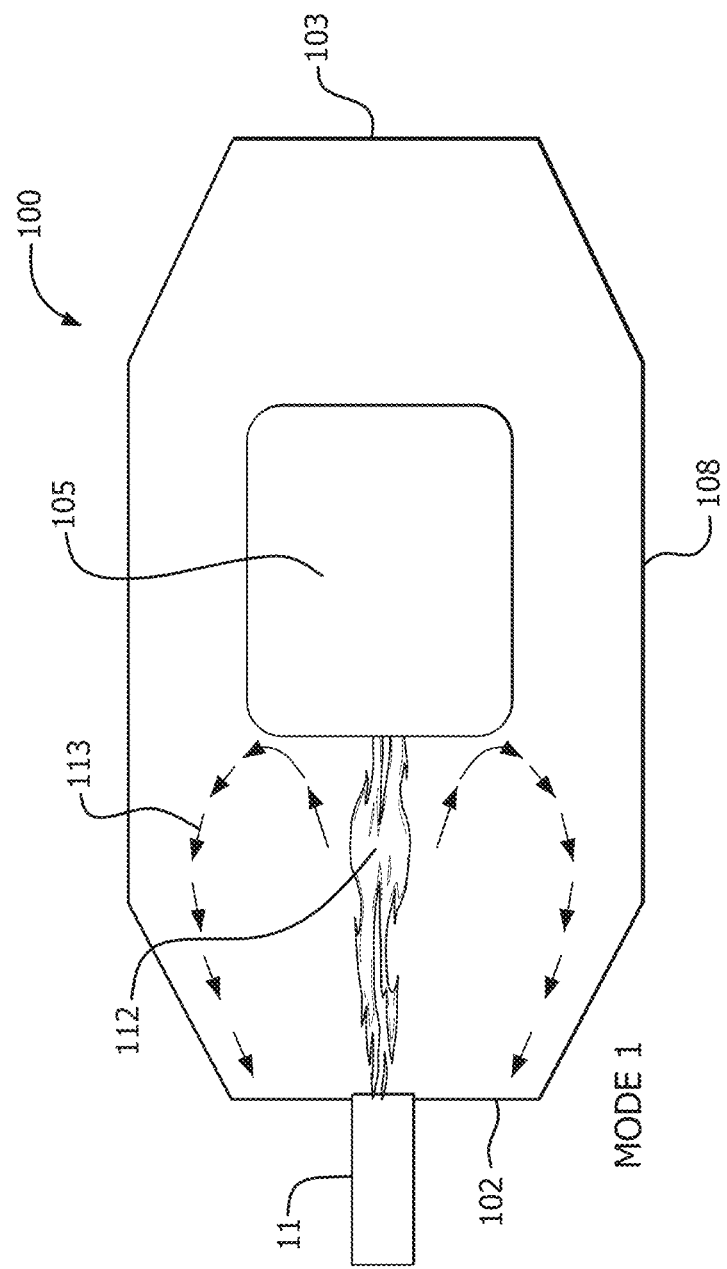

MODE 2C

MODE 2D

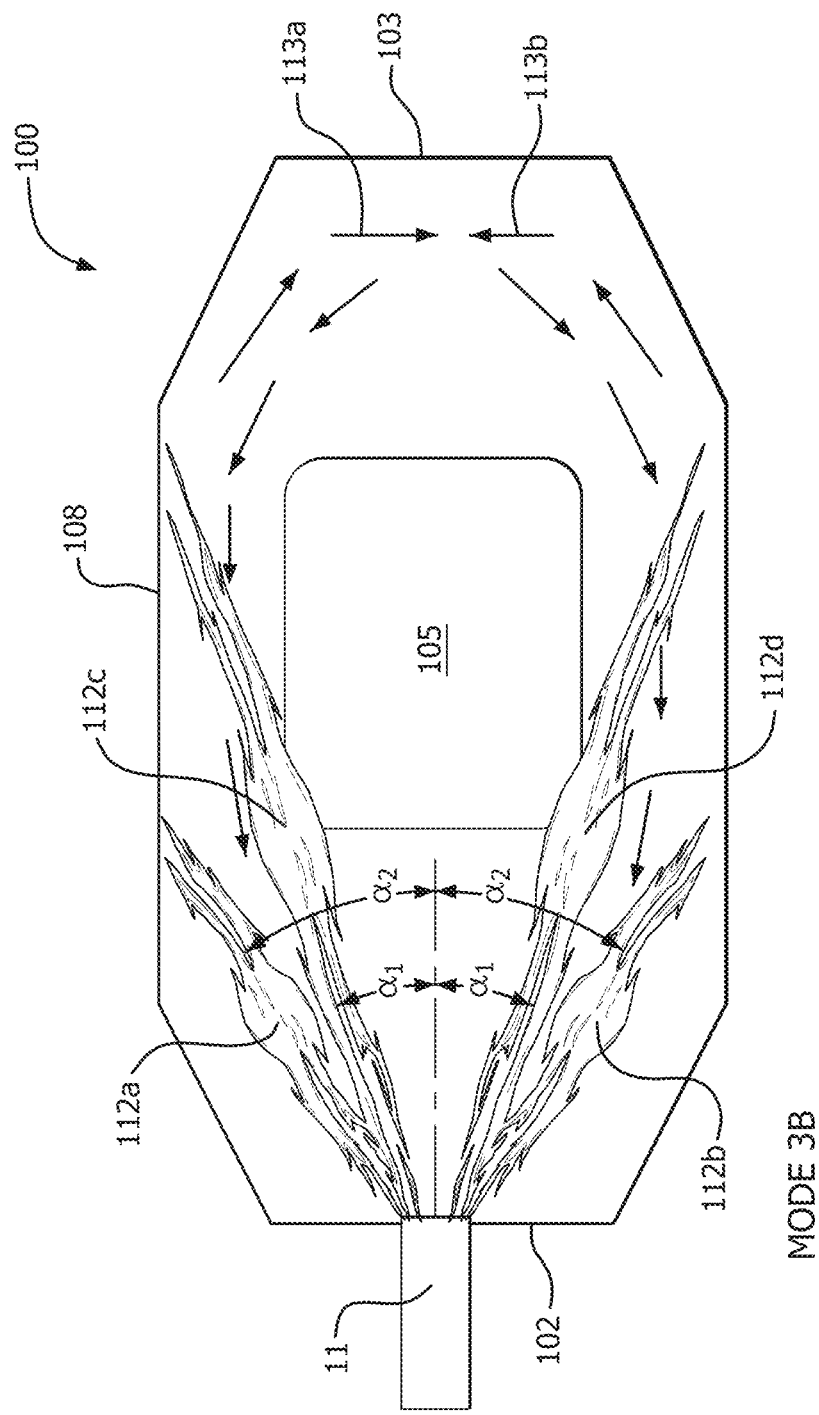

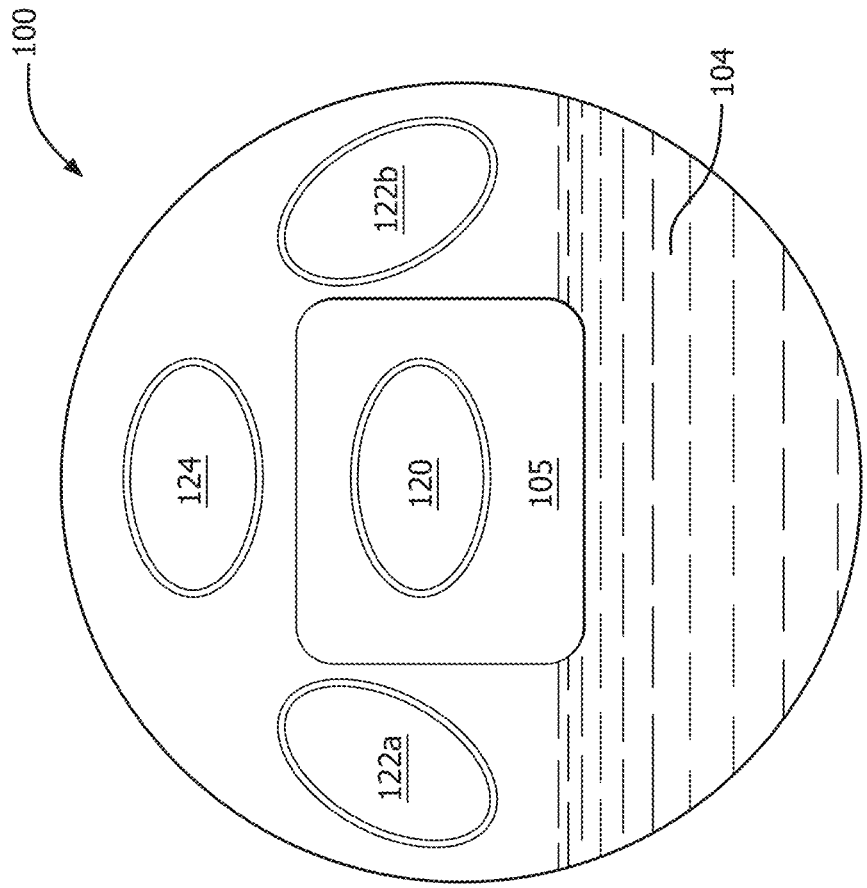

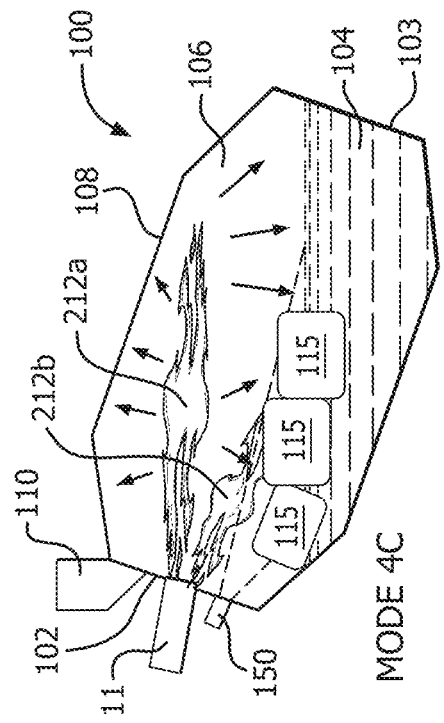
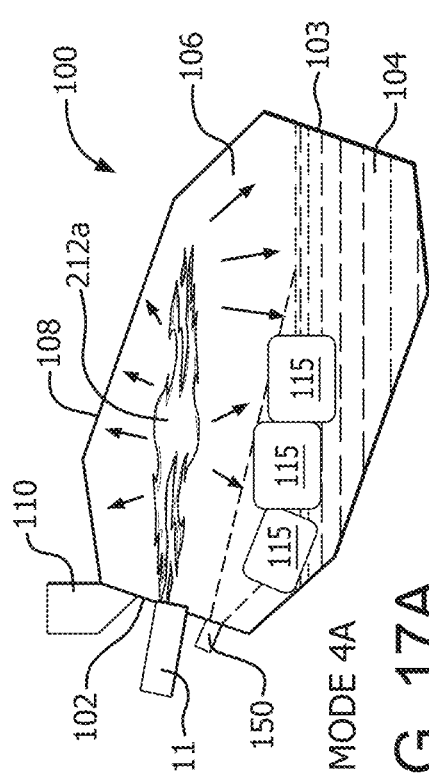
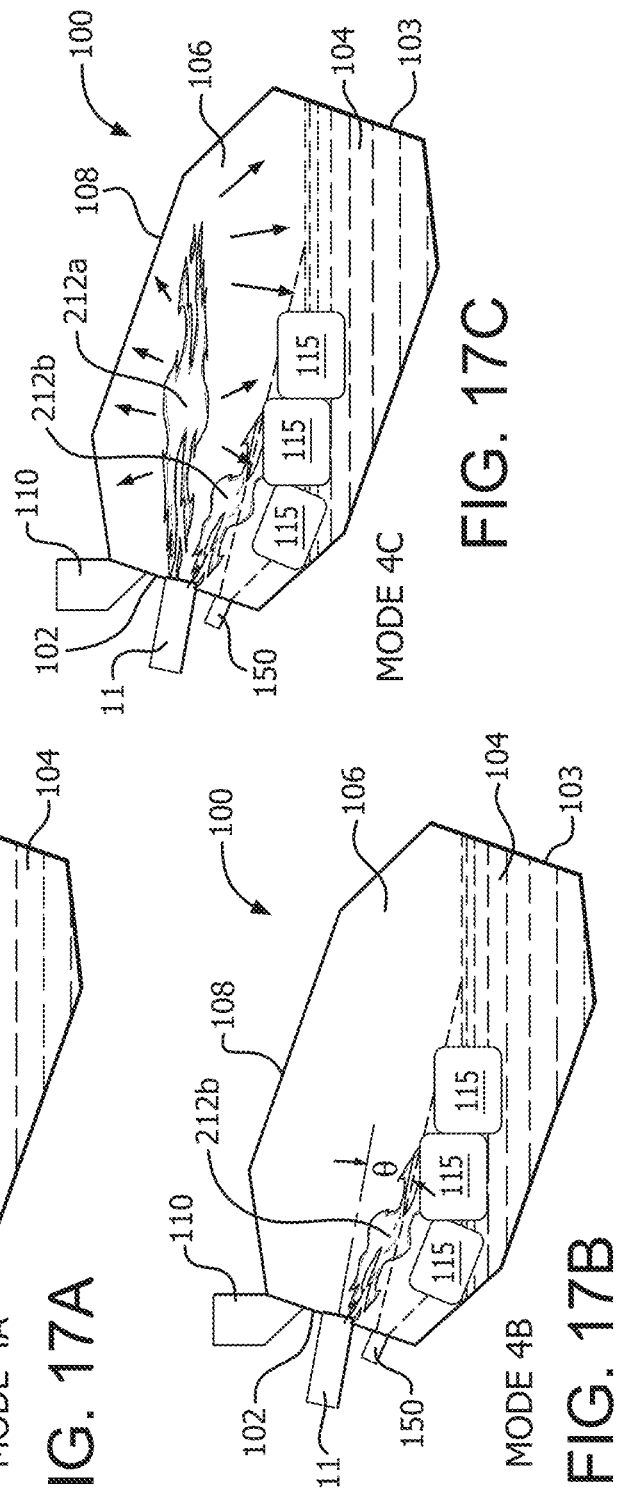

SELECTIVE OXY-FUEL BURNER AND METHOD FOR A ROTARY FURNACE

BACKGROUND

This application relates to a system of employing one or more oxy-fuel burners in a rotary furnace and methods for operating such burners in a rotary furnace, to provide enhanced heat transfer and energy efficiency.

The melting performance of a conventional rotary furnace (e.g., secondary aluminum) is usually more efficient than a stationary furnace as a result of interaction between refractory and the metal bath as the furnace rotates. In particular, heat transferred to the refractory above the metal bath can be transferred to conduction and convention as the furnace rotates and the refractory becomes submerged under the metal bath. However, the flame-furnace interaction sometimes results in striations or non-uniformities of heat and temperature in the furnace, especially in a tilted rotary furnace, and especially when unmelted scrap in the furnace impedes penetration of the flame toward the rear of the furnace.

In a conventional rotary furnace system, for example as in the double-pass furnace shown in FIGS. 7, 8, and 9A-9C, a nozzle-mixed (non-premixed or diffusion) burner 311 is mounted in the charge door (front end) 102 of a furnace 10 and fires generally into the center of the furnace headspace 106 above the charge 104. For such a burner 311, combustion (the flame 312) evolves over a finite length within the furnace 100, which defines the flame length, flame structure, and energy release profile. The mixing and combustion of fuel with oxidizer is complete when the flame is allowed to develop fully and unobstructed, as in FIG. 7. Because of the double-pass design of the furnace, the flue gas duct 110 is usually located on the door or at the front end 102 in close proximity to the burner 311. When the burner 311 is allowed to achieve a fully developed flame, the flame 312 extends to near the opposite (rear) end 103 of the furnace 100, and then the hot combustion gases 313 travel back to the flue gas duct 110, thereby giving significant time and exposure for heat transfer from the flame 312 to the charge 104 and the refractory lining the furnace walls 108.

However, when large chunks 105 of scrap, ingots, or dross are processed through a double-pass rotary melting furnace 100, they often block the evolution and development of a complete flame, as in FIG. 8. When the flame 312 is obstructed, it results in incomplete mixing and incomplete development of the flame within the furnace 100, due to short circuiting of the fuel and oxidizer (incomplete combustion products 313) to the flue gas duct 110. This, in turn, results in elevated flue gas temperatures and energy loss from the furnace 100. It also causes non-uniform heating and/or melting of the charge material 104 in the furnace 100, increasing the potential of melt losses due to overheating of the front portion 114 of the furnace 100 while leaving the back portion 118 of the furnace 100 with cold spots and buildups (resulting in loss of productivity). Typically, the firing rate of the burner 311 is erroneously increased in the attempt to "reach the back" of the furnace 100, which further exacerbates the problem.

FIGS. 9A-9C show CFD modeling results for the scenario in which a large ingot 105 or block of scrap impedes flame development. As shown in FIG. 9A, the flame 313 deflects off the front surface of the large ingot 105, causing the hottest combustion gases to remain at the front face of the ingot 105 and in the front portion 114 of the furnace 100 near the burner 311 and flue gas duct 310, while the middle portion 116 and rear portion 118 of the furnace 100 receive less flow of combustion products and less heat. FIG. 9B shows that the front surface of the ingot 105, where the flame 312 impinges, is very hot while the rear of the ingot 105 and the melt is relatively cool. FIG. 9C shows that the front 114 portion of the furnace 100 is hot, perhaps overheated, while the rear portion 118 of the furnace 118 remains relatively colder.

SUMMARY

A selective burner system and method is provided to enhance the efficiency of melting charge in a rotary furnace, and to avoid potential overheating and oxidation of the charge. The configuration and operational method of the burner enables optimum heat flux delivery both spatially and temporally so that a more uniform temperature distribution can be achieved and maintained in a furnace, and that more rapid cycle times can be achieved. Uniform heat flux is achieved by directing the heat flux to appropriate locations, for example as determined by an algorithm, based on furnace process parameters and/or cycle time, or based on real-time feedback from one or more sensors, for certain amounts of time. The burner and method enable selectively longer and more penetrating flames that can impinge the charge in a furnace to provide improved melting, while minimizing oxidative melt losses. In particular, multiple high momentum flames are directed towards and around the charge in a cyclical manner. Overheating is avoided and energy is distributed more evenly to the solid charge, furnace refractory, and over the melt bath. The burner has a plurality of separate burner elements, located either in one house or split among more than one housing. Each burner element has its own flame in a passive or active state that can be modulated in various patterns and frequencies to achieve the desired heat flux profile. Each active flame is associated with a flame region in the furnace.

Specifically for a rotary furnace, strategically located sensors positioned inside or outside of the furnace for detecting various process parameters related to the furnace can be used to detect the presence of large unmelted scrap, and the evolution of striations in heating, or the system can be preprogrammed based on scrap mix (e.g., if the scrap has large chunks or small chunks), to use multiple interrelated burner elements to direct heat in one or more desired locations in the furnace.

Various embodiments of a burner system are described.

Aspect 1. A selective oxy-fuel burner for mounting in a charge door of a rotary furnace, the burner comprising: at least two burner elements each oriented to fire into different portions of the furnace, each burner element comprising: a selective distribution nozzle configured to flow a first reactant; and a proportional distribution nozzle configured to flow a second reactant; at least one sensor to detect one or more process parameters related to furnace operation; and a controller programmed to independently control the first reactant flow to each selective distribution nozzle based at least in part on the detected process parameters such that at least one burner element is active and at least one burner element is passive, wherein the first reactant flow in the selective distribution nozzle of an active burner element is greater than an average first reactant flow to the selective distribution nozzles and the first reactant flow in the selective distribution nozzle of a passive burner element is less than the average first reactant flow to the selective distribution nozzles; wherein the second reactant is substantially proportionally distributed to the proportional distribution nozzles; and wherein the first reactant is one of a fuel and an oxidant and wherein the second reactant is the other of a fuel and an oxidant.

Aspect 2. The burner of Aspect 1, wherein one of the least two burner elements has a flame axis substantially perpendicular to the charge door and another of the at least two burner elements has a flame axis at a non-zero angle, α, from perpendicular with respect to the charge door; wherein the angle α is equal to or less than about 75°.

Aspect 3. The burner of Aspect 1 or 2, wherein at least one sensor includes an overheating sensor for detecting overheating of the charge door, wherein when overheating is detected, at least one currently active burner element is switched to passive while at least one burner element remains or is switched to active.

Aspect 4. The burner of Aspect 1 or 2, wherein the at least one sensor includes exhaust property sensor for detecting changes in one or more exhaust properties such as exhaust composition, wherein when the exhaust property indicates incomplete combustion, at least one currently active burner element is switched to passive while at least one burner element remains or is switched from passive to active.

Aspect 5. The burner of Aspect 1 or 2, wherein the at least one sensor includes an overheating sensor for detecting overheating of the charge door and an exhaust property sensor for detecting changes in one or more exhaust properties, such as exhaust composition, wherein overheating is detected and the exhaust property indicates incomplete combustion, at least one currently active burner element is switched to passive while at least one burner element remains or is switched from passive to active.

Aspect 6. The burner of any of Aspects 1 to 5, wherein the at least one sensor includes a non-contact sensor for detecting the presence of solid charge impeding flame development in the furnace, wherein solid charge is present in the furnace, at least one currently active burner element is switched to passive while at least one burner element remains or is switched from passive to active.

Aspect 7. The burner of any of Aspects 1 to 6, wherein in each burner element the proportional distribution nozzle is annular and surrounds the selective distribution nozzle.

Aspect 8. The boost burner of any of Aspects 1 to 7, further comprising: at least one staging nozzle spaced apart from each of the burner elements and configured to flow a secondary second reactant; wherein the controller is further programmed to control a staging ratio to be less than or equal to about 75%, wherein the staging ratio is the ratio of the second reactant contained in the secondary second reactant flow to the total flow of second reactant.

Aspect 9. A rotary furnace comprising: a charge door and an exhaust port located at one end of the furnace; and an oxy-fuel burner mounted in the charge door, the burner comprising: at least two burner elements each oriented to fire into different portions of the furnace, each burner element comprising: a selective distribution nozzle configured to flow a first reactant; and an proportional distribution nozzle configured to flow an oxidant; at least one sensor to detect one or more process parameters in the furnace; and a controller programmed to independently control the first reactant flow to each selective distribution nozzle based at least on part on the detected process parameters such that at least one burner element is active and at least one burner element is passive, wherein the first reactant flow in the selective distribution nozzle of an active burner element is greater than an average first reactant flow to the selective distribution nozzles and first reactant flow in the selective distribution nozzle of a passive burner element is less than the average first reactant flow to the selective distribution nozzles; wherein the second reactant is substantially proportionally distributed to the proportional distribution nozzles; and wherein the first reactant is one of a fuel and an oxidant and wherein the second reactant is the other of a fuel and an oxidant.

Aspect 10. A method of operating a rotary furnace having a charge door and an exhaust port located at one end of the furnace, and an oxy-fuel burner mounted in the charge door, the burner having at least two burner elements each oriented to fire into different portions of the furnace, each burner element comprising a selective distribution nozzle and a proportional distribution nozzle, the burner further having a controller programmed to independently control flow of a first reactant to the selective distribution nozzle of each burner element, wherein the flow of a second reactant to the proportional distribution nozzles is substantially proportionally distributed, the method comprising: flowing a second at an oxidant flow rate through each of the annular nozzles; detecting one or more process parameters in the furnace; selecting, based at least in part on the detected process parameters, at least one of the burner elements to be active and at least one of the burner elements to be passive; flowing a first reactant at an active jet flow rate through the selective distribution nozzle of the at least one active burner element; flowing the first reactant at a passive jet flow rate through the selective distribution nozzle of the at least one passive burner element; and flowing a second reactant substantially proportionally through each of the proportional distribution nozzles; wherein the active jet flow rate is greater than an average flow rate through the selective distribution nozzles and the passive jet flow rate is less than the average flow rate through the selective distribution nozzles; and wherein the first reactant is one of a fuel and an oxidant and wherein the second reactant is the other of a fuel and an oxidant.

Aspect 11. The method of Aspect 10, further comprising: detecting overheating of the charge door; and when overheating is detected, switching at least one currently active burner element to passive while maintaining as active or switching to active at least one other burner element.

Aspect 12. The method of Aspect 10 or 11, further comprising: detecting at least one exhaust property such as exhaust composition; when the exhaust property indicates incomplete combustion, switching at least one currently active burner element to passive while maintaining as active or switching to active at least one other burner element.

Aspect 13. The method of any of Aspects 10 to 12, further comprising: detecting when the at least one currently active burner element is discharging a flame that impinges solid charge in the furnace; and switching said at least one currently active burner element to passive while maintaining as active or switching to active at least one other burner element.

Aspect 14. The method of any of Aspects 10 to 13, wherein the ratio of the active jet flow rate to the passive jet flow rate is from about 5 to about 40.

Aspect 15. The method of any of Aspects 10 to 14, wherein a passive burner element has an equivalence ratio of from about 0.2 to about 1, and wherein an active burner element has an equivalence ratio of from about 1 to about 10, wherein the equivalence ratio is the ratio of theoretical stoichiometric oxidant flow to actual oxidant flow through one of the distribution nozzles to combust the fuel flowing through the other of the distribution nozzles.

Other aspects of the invention are described below.

BRIEF DESCRIPTION OF THE DRAWINGS

FIG. 5A(a) shows a burner having a central staging nozzle surrounded by four burner elements angled radially outward; FIG. 5A(b) shows a burner having a central staging nozzle surrounded by four burner elements angled tangentially along a circumscribed circle; FIG. 5A(c) shows a burner having a collinear arrangement of alternating burner elements and staging nozzles in which all but the central staging nozzle are angled outward; FIG. 5A(d) shows a burner having four collinear burner elements adjacent to and substantially parallel to the major axis of a slotted staging nozzle; and FIG. 5A(e) shows a pair of aligned flat flame burner elements and a pair of collinear staging nozzles adjacent to and substantially parallel to the major axis of each burner element.

FIG. 5B(a) shows a burner having four burner elements angled radially outward; FIG. 5B(b) shows a burner having four burner elements angled tangentially along a circumscribed circle; FIG. 5B(c) shows a burner having a two collinear burner elements each angled outward away from the other burner; FIG. 5B(d) shows a burner having four collinear burner elements angled outward in adjacent pairs from the other adjacent pair; and FIG. 5B(e) shows a pair of aligned flat flame burner elements. FIG. 5B(f) shows a burner having multiple rows of co-linear burner elements.

FIGS. 5C(a)-5C(e) are end views of further embodiments of a selective burner without staging. FIG. 5C(a) shows a burner having four burner elements as in FIG. 16, with three collinear burner elements, one oriented in the burner axial direction and one on either side angled outward, and a fourth burner element angled upward. FIG. 5C(b) shows a burner having three collinear burner elements, one oriented in the burner axial direction and one on either side angled outward. FIG. 5C(d) shows a burner having to burner elements, an upper burner element oriented in the burner axial direction and a lower burner element angled downward toward the charge. FIG. 5C(e) shows a burner having four elements as in FIG. 16, with three collinear burner elements, a central burner element angled downward, one on either side angled outward, and a fourth burner element angled upward.

FIG. 9A is the combustion temperature profile, showing that the highest combustion temperatures are at the front face of the chunk where the flame is deflected and that substantial combustion products do not reach the back portion of the furnace. FIG. 9B is a temperature profile of the charge, showing high temperatures on the front face of the chunk where flame impingement occurs, lower temperatures on the rear portion of the chunk, and very low temperatures in the molten charge in the back portion of the furnace. FIG. 9C is a temperature profile of the walls of the furnace, showing higher wall temperatures in the front portion of the furnace, lower wall temperatures in the rear portion of the furnace, and a sharp gradient in temperature across the location of the chunk of charge.

FIG. 10 is a cutaway top view of a double-pass rotary furnace with an embodiment of a selective burner mounted in the charge door showing a flame impinging on a chuck of charge in the furnace. The flame can be provided by a conventional burner or by one burner element of a selective burner.

FIG. 11A shows a Mode 2A in which a first burner element is firing toward a first side of the furnace, and FIG. 11B shows a Mode 2B in which a second burner element is firing toward a second side of the furnace.

FIG. 13A shows a Mode 2C in which a two burner elements are firing toward a first side of the furnace, and FIG. 13B shows a Mode 2B in which another two burner elements are firing toward a second side of the furnace.

FIG. 14 is a cutaway top view of a double-pass rotary furnace with an embodiment of a selective burner mounted in the charge door as in FIGS. 13A and 13B, showing a flow pattern when at least four burner elements are active to direct flames two flames at different angles toward both sides of the furnace simultaneously.

FIG. 15A is the combustion temperature profile, which for the selective burner case shows that the highest combustion temperatures are along the side of the chunk and extend farther back into the furnace, as compared with the conventional burner case of FIG. 9A. FIG. 15B is a temperature profile of the charge, which for the selective burner case shows the absence of a hot spot on the front face of the chunk (since there is no flame impingement) and higher temperatures in the molten charge in the back portion of the furnace as compared, with the conventional burner case of FIG. 9B. FIG. 15C is a temperature profile of the walls of the furnace, which for the selective burner case shows more uniform wall temperatures from the front portion to the back portion of the furnace as compared with the conventional burner case of FIG. 9C.

FIG. 16 is a cutaway end view of a double-pass furnace with an embodiment of a selective burner having four burner elements, one burner element arranged to direct a flame so as to impinge a chunk of charge in the furnace, two burner elements arranged to direct flames around either side of a chunk of charge in the furnace, and one burner element arranged to direct a flame above a chunk of charge in the furnace.

FIGS. 17A-17C are each a cutaway side view of a double-pass rotary furnace with an embodiment of a selective burner mounted in the charge door, the burner having at least two burner elements, including one burner element arranged to direct a flame downward onto the charge in the front portion of the furnace and another burner element arranged to direct a flame into the headspace above the charge. The selective burner may be operated in three different modes: mode A as shown in FIG. 17A firing only the burner element directing a flame into the headspace, mode B as shown in FIG. 17B firing only the burner element directing flame downward onto the charge to supply extra heat to melt charge that remains solid in the front portion of the furnace, and mode C as shown in FIG. 17C firing both burner elements.

DETAILED DESCRIPTION

Figure 1A:
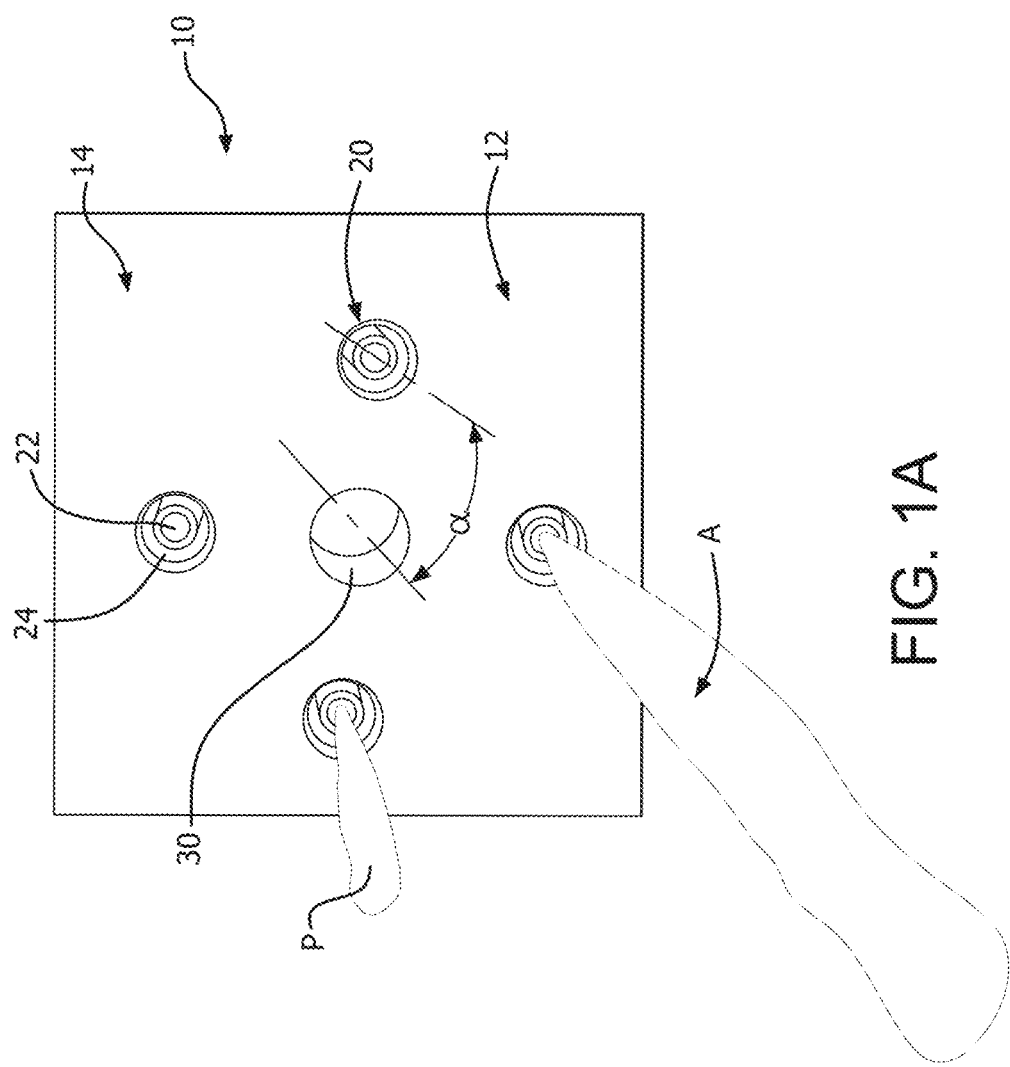
FIG. 1A is an end perspective view of an embodiment of a selective burner with oxidant staging.
Figure 1B:
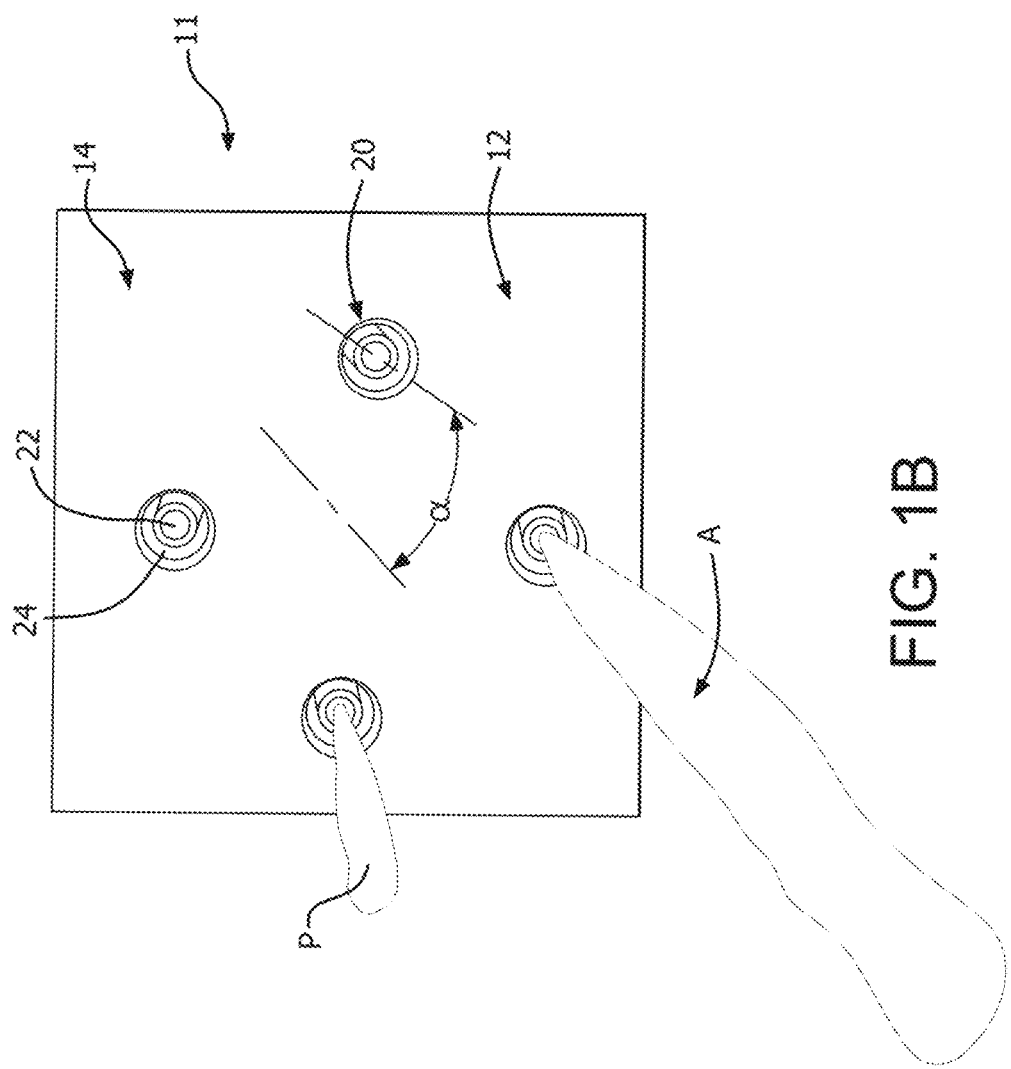
FIG. 1B is an end perspective view of an embodiment of a selective burner without oxidant staging.

FIG. 1A depicts an embodiment of a selective burner 10 having staging of one reactant (i.e., a "staged burner"), while FIG. 1B depicts an embodiment of a selective boost burner 11 without staging of either reactant (i.e., an non-staged burner"). The burners 10 and 11 each include a body 12 having a face 14, wherein when the burner 10 or 11 is mounted in a furnace (for example as in FIG. 7 or in FIGS. 10-15C or in FIGS. 17-18), the face 14 is exposed to the combustion zone in the furnace.

Figure 4:
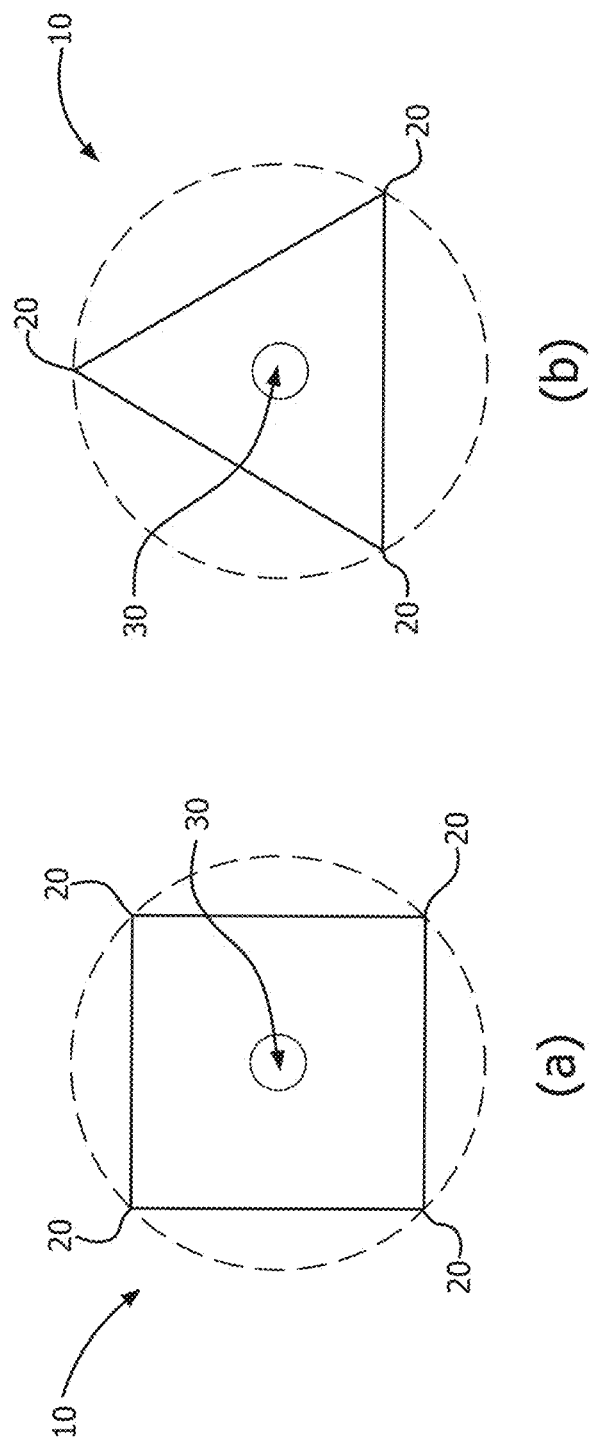
FIG. 4 is an end view schematic showing nozzle orientations for two embodiments of a selective burner.

The non-staged burner 11 includes a plurality of burner elements 20 oriented so as to define a circumscribed circle (see FIG. 4), with the burner elements 20 preferably equally spaced around the circumscribed circle. The staged burner 10 further includes at least one staging nozzle 30 positioned within the circumscribed circle. For reference purposes, an active jet (A) and a passive jet (P) are depicted, to show that the active jet has a larger flame than the passive jet.

Figure 5A:
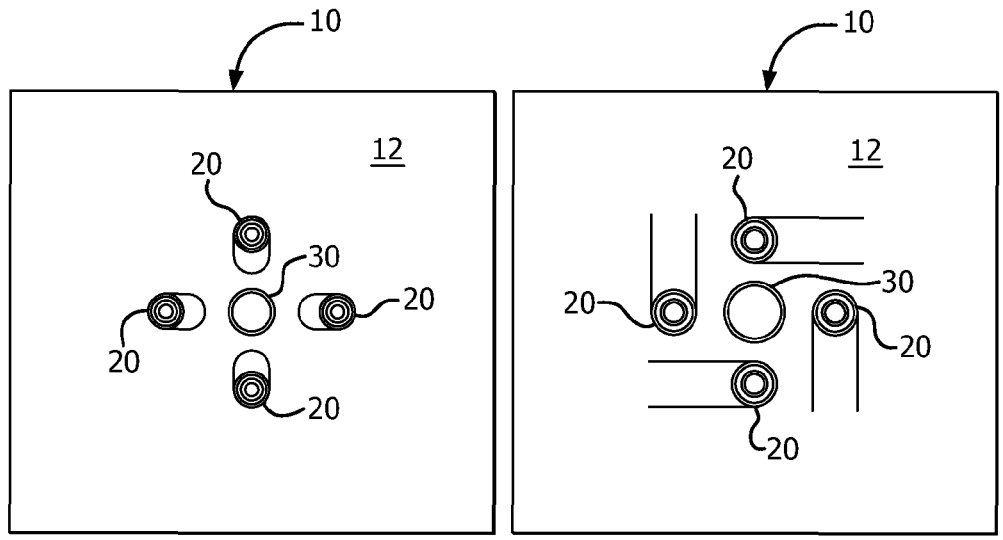
FIGS. 5A(a)-5A(e) are end views of various embodiments of a selective burner with staging.
Figure 5A:
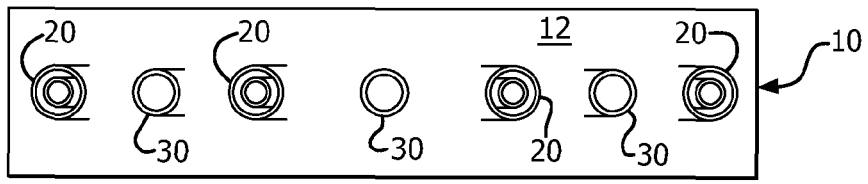
Figure 5A:
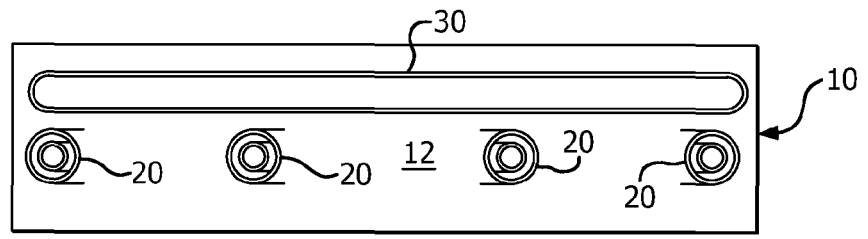
Figure 5A:
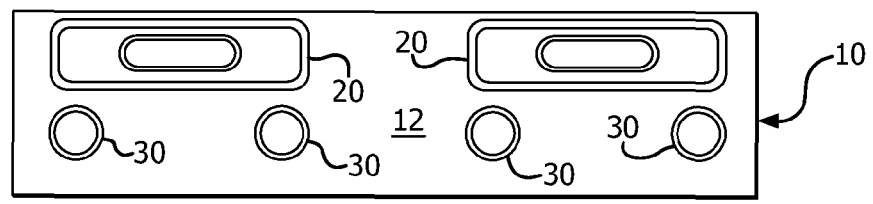

The burners 10 and 11 depicted in FIGS. 1A and 1B, respectively, each have four burner elements 20 spaced apart at approximately 90° intervals. However, it is understood that the burner 10 or 11 may include any number n of burner elements 20 equal to or greater than two. For example, a burner 10 or 11 may have two burner elements 20 spaced so as to be diametrically opposed (as shown in FIGS. 5A(d) and 5B(d)), or alternately three burner elements 20 spaced apart at approximately 120° intervals, or five or more burner elements 20 spaced apart at approximately even intervals. It is also understood that for some furnace geometries, configurations, or operating conditions, it may be desirable to have a burner 10 or 11 with a plurality of burner elements 20 that are unequally spaced apart around the circumscribed circle. In a further alternative, the burner 10 or 11 may have a plurality of burner elements 20 that are positioned to define a geometric shape other than a circle, for example an oval or an irregular polygon, depending on the furnace geometry and configuration.

In addition, the non-staged burner 11 may include two or more burner elements 20 that are positioned in multiple housings at different locations in a furnace, instead of all burner elements 20 being in the same housing, but are operated in a coordinated selective manner as is described herein.

The staged burner 10 of FIG. 1A has one centrally positioned staging nozzle 30. However, it is understood that a plurality of staging nozzles 30 may be provided, wherein the staging nozzles 30 may be all of the same size or of different sizes. Additionally, depending on furnace geometry, desired flame characteristics, the orientation of the individual burner elements 20, and other factors, the staging nozzle(s) 30 may be positioned off center within the circumscribed circle defined by the burner elements 20. The staging nozzle 30 may be of any shape.

In the both the staged burner 10 and the non-staged burner 11, each burner element 20 includes a selective distribution nozzle 22 surrounded by an annular proportional distribution nozzle 24. A selectively distributed reactant is flowed through the selective distribution nozzle 22 while a proportionally distributed reactant is flowed through the annular proportional distribution nozzle 24, wherein one reactant is a fuel and the other reactant is an oxidant. In the staged burner 10, a portion of the proportionally distributed reactant is also flowed through the staging nozzle 30. In one embodiment of the burner 10 or 11, fuel is flowed through the selective distribution nozzle 22 as the selectively distributed reactant, while oxidant is flowed through the annular proportional distribution nozzle 24 as the proportionally distributed reactant. In another embodiment of the burner 10 or 11, oxidant is the selectively distributed reactant flowed through the selective distribution nozzle 22 and fuel is the proportionally distributed reactant flowed through the annular proportional distribution nozzle 24. Further, in alternate embodiments of the burner element 20 the proportional distribution nozzle 24 need not be annular, but instead can include one or more nozzles positioned in close proximity to the selective distribution nozzle 22. For example, one proportional distribution nozzle 24 could be adjacent to the selective distribution nozzle 22, or a plurality of proportional distribution nozzles 24 could be positioned adjacent to and circumferentially around the selective distribution nozzle 22. In any configuration, the proportional distribution nozzle 24 (or nozzles 24) should be sufficient close to the selective distribution nozzle 22 that the fuel and oxidant interact and combust to form a stable flame.

In the staged burner 10, the proportion of proportionally distributed reactant introduced through the annular proportional distribution nozzles 24 as compared with the staging nozzle 30 can be adjusted in order to maintain stable burner operation and/or to control flame properties such as heat release profile. The term "staging ratio" denotes the amount of proportionally distributed reactant flow through the staging nozzle 30 divided by the total amount of the proportionally distributed reactant flow through the staging nozzle 30 and the annular proportional distribution nozzles 24 combined.

As used herein, the term "fuel" denotes any hydrocarbon-containing substance that can be used as fuel in a combustion reaction. Preferably, the fuel is a gaseous fuel, such as natural gas, but the fuel may also be an atomized liquid fuel or a pulverized solid fuel in a carrier gas. As used herein, the term "oxidant" denotes any oxygen-containing substance that can oxidize fuel in a combustion reaction. An oxidant may be air, vitiated air (i.e., gas with less than about 20.9% oxygen), oxygen-enriched air (i.e., gas with greater than about 20.9% oxygen), or essentially pure oxygen (i.e., gas with approximately 100% oxygen). In various embodiments, the oxidant is an oxygen-enriched air having an oxygen concentration of at least about 23%, at least about 26%, at least about 40%, at least about 70%, or at least about 98%.

Figure 6:
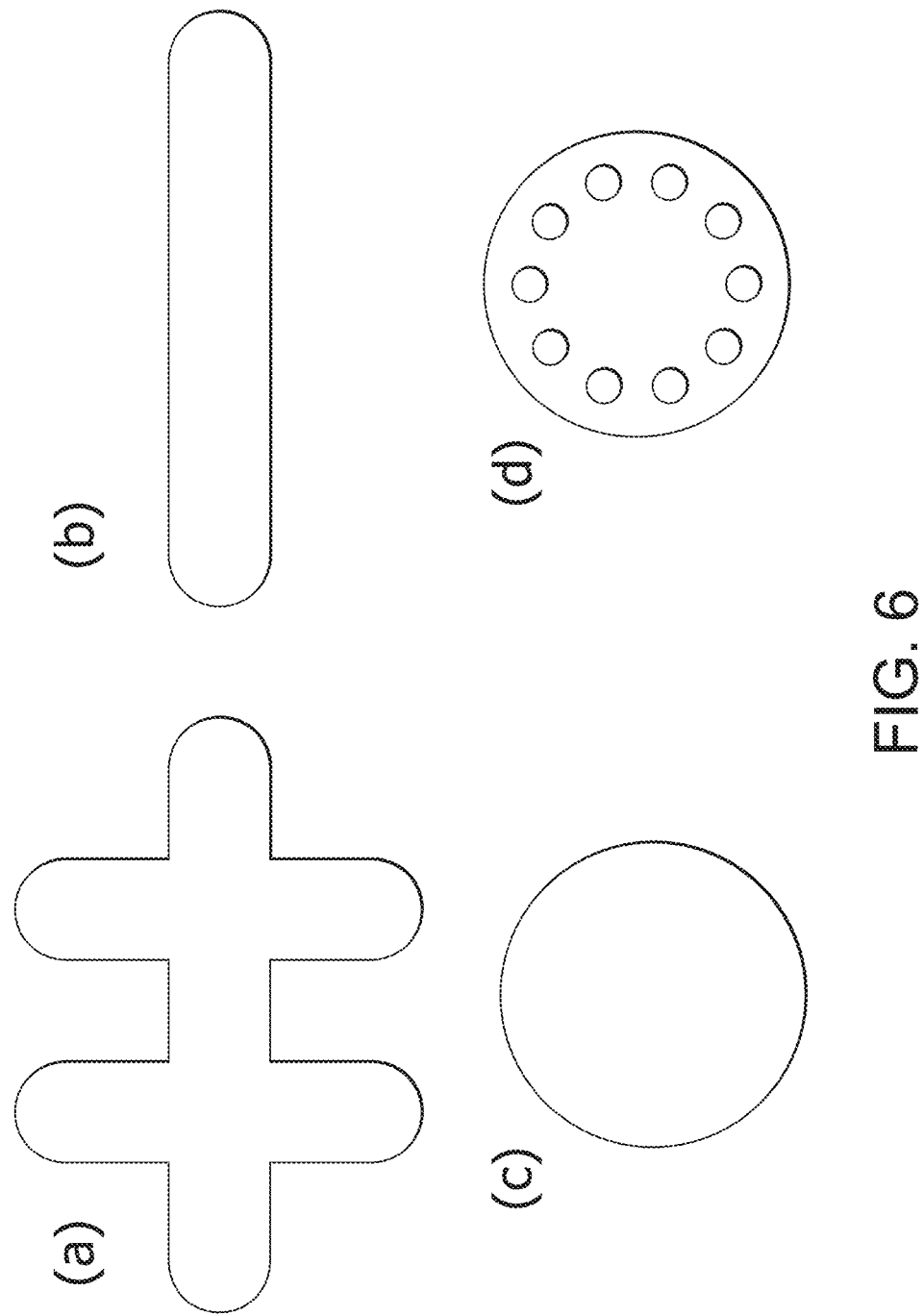
FIG. 6 shows various possible geometries of a distribution nozzle within each burner element.

The selective distribution nozzle 22 can be of any shape. A subset of possible exemplary shapes is shown in FIG. 6, including a slotted nozzle (FIG. 6a), a single-slot nozzle (FIG. 6b), a circular nozzle (FIG. 6c), and a multi-hole nozzle (FIG. 6d). A more detailed discussion of possible nozzle shapes can be found in U.S. Pat. No. 6,866,503, incorporated herein by reference in its entirety. For example, to create a luminous flame with high radiative transfer properties, a selective distribution nozzle 22 having a shape factor of less than 10 can be used, while to create a non-luminous flame which may have lower NOx, a selective distribution nozzle having a shape factor of 10 or greater can be used. Luminous mode might be preferred for melting operations, while non-luminous mode might be preferred for reheating operations. Note that a high shape factor nozzle can include a multi-hole nozzle. As described in detail in U.S. Pat. No. 6,866,503, the shape factor, $\sigma$, is defined the square of the perimeter, P, divided by twice the cross-sectional area, A, or in equation terms:

$$\sigma = P^2/2A.$$

Figure 2A:
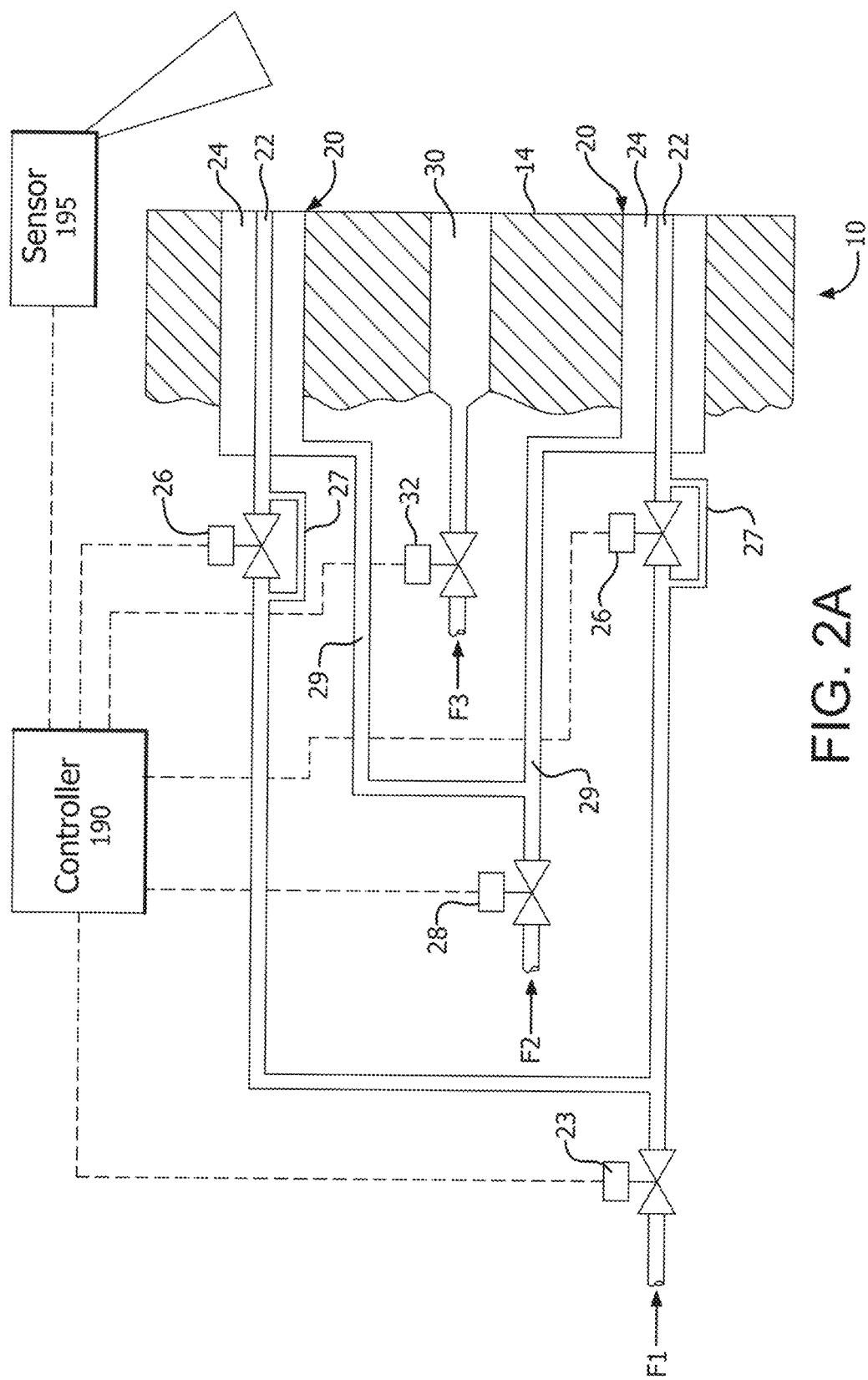
FIG. 2A is a control schematic for an embodiment of a selective burner with staging as in FIG. 1A.
Figure 2B:
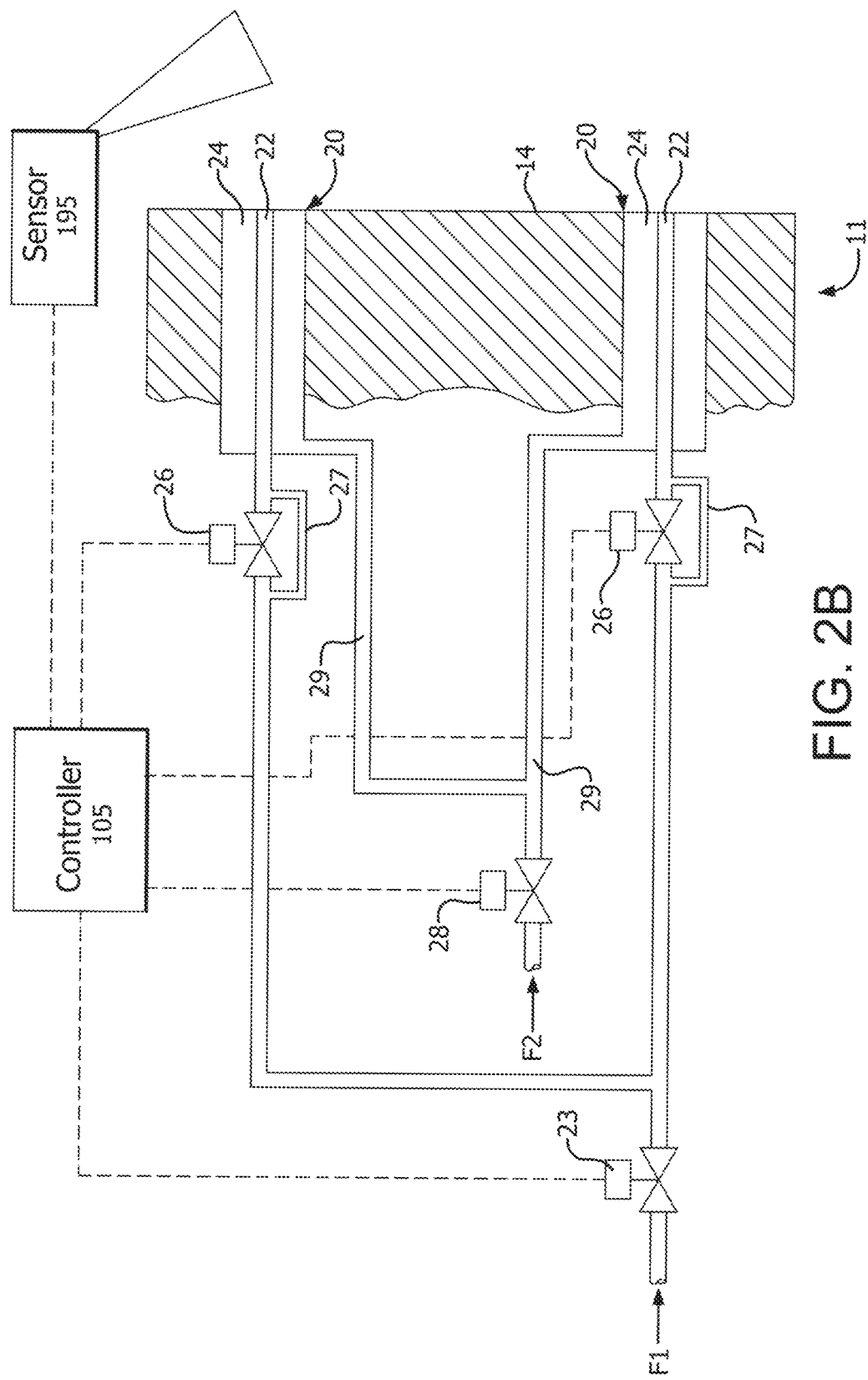
FIG. 2B is a control schematic for an embodiment of a selective burner without staging as in FIG. 1B.

FIG. 2A shows a simplified control schematic for a staged burner 10, and FIG. 2B shows a simplified control schematic for a non-staged burner 11, as described above. A first fluid F1 is supplied to the selective distribution nozzles 22 at a total flow rate controlled by a control valve 23. The flow of the first fluid F1 to each selective distribution nozzle 22 is separately controlled. In one embodiment, a control valve 26 upstream of each selective distribution nozzle 22 is modulated between a high flow and a low flow position, corresponding respectively to an active state and a passive state for the burner element 20 containing that selective distribution nozzle 22. In an alternate embodiment, the control valve 26 is positioned in parallel with a bypass passage 27. In this embodiment, the control valve 26 is modulated between an open position and a closed position, again corresponding respectively to active and passive states of the burner element 20, while the bypass passage 27 allows a relatively small amount of flow to bypass the control valve 26 so that some of the first fluid F1 is always flowing to the selective distribution nozzle 22, even in the passive state. The flow rates to each of the selective distribution nozzles 22 can be set so that the active state flow rates of the first fluid F1 to each selective distribution nozzle 22 can be different or the same, and the passive state flow rates of the first fluid F1 to each selective distribution nozzle 22 can be different or the same, depending on the requirements of a particular furnace or application.

The effect of either arrangement is to modulate the flow through the selective distribution nozzle 22 between an relatively higher active flow rate and a relatively lower passive flow rate. For example, an active flow rate may be defined as a flow rate greater than an average flow rate to the selective distribution nozzles 22, while a passive flow rate may be defined as a flow rate less than the average flow rate to the selective distribution nozzles 22. The average flow rate is determined by dividing the total flow rate of the first fluid F1 by the total number n of selective distribution nozzles 22/burner elements 20. Other relationships between the active flow rate and the passive flow rate may be used, with the active flow rate always being greater than the passive flow rate.

Regardless how the active and passive flow rates are determined, the passive flow rate must be greater than zero flow. The passive flow rate is sufficient to maintain combustion in each burner element 20, so as to provide a mechanism for immediate ignition when a burner element 20 is switched from the passive state to the active state. The non-zero passive flow rate also protects the selective distribution nozzle 22 from entry of foreign materials. In one embodiment, the passive flow rate is less than or equal to half of the active flow rate. In another embodiment, the ratio of the active flow rate to the passive flow rate is at least about 5 and no greater than about 40. In yet another embodiment, the ratio of the active flow rate to the passive flow rate is at least about 15 and no greater than about 25.

A second fluid F2 is supplied to the annular proportional distribution nozzles 24. A control valve 28 controls the total flow rate of the second fluid F2 to the annular proportional distribution nozzles 24, and a manifold 29 distributes the flow approximately equally across the n annular proportional distribution nozzles 24.

In the staged burner 10 (FIG. 2A) but not in the non-staged burner 11 (FIG. 2b), a third fluid F3 is supplied to the staging nozzle 30, and the flow rate of the third fluid F3 is controlled by a control valve 32. The staging nozzle 30 may include a swirl vane or other mechanism (not shown) to impart swirl to the third fluid F3 exiting the staging nozzle 30. Swirl imparted on the third fluid F3 will result in break-up of that fluid jet, which can aid in entrainment of the third fluid F3 jet by the active jet(s). However, intense swirl is not desirable since it could dominate the flow structure and alter flame shapes.

The second fluid F2 and the third fluid F3 contain the same type of reactant, either fuel or oxidant. For example, when the first fluid F1 is fuel, the second fluid F2 and the third fluid F3 are each oxidants, and when the first fluid F1 is oxidant, the second fluid F2 and the third fluid F3 are each fuels. In one embodiment, the second fluid F2 and the third fluid F3 are different fluids, i.e., each has the same reactant (fuel or oxidant) but in different concentrations. In this case, the control valve 28 and the control valve 32 must be separate valves to control the two fluids F2 and F3. In an alternate embodiment (not shown), when the second fluid F2 and the third fluid F3 are the same fluid having the same concentration of the same reactant, a staging valve can be used in place of the control valve 28 and the control valve 32 to distribute a portion of the flow approximately equally to the n proportional distribution annular nozzles 24 and the remainder of the flow to the staging nozzle 30.

In the depicted embodiments of FIGS. 2A and 2B, the flow rate of the second fluid F2 to each of the annular proportional distribution nozzles 24 is not controlled independently. As a result, each annular proportional distribution nozzle 24 always flows about an average flow rate of the second fluid F2 when the control valve 28 is open. The average flow rate is determined by dividing the total flow rate of the second fluid F2 by the total number n of annular proportional distribution nozzles 24/burner elements 20. Alternatively, the flow rate of the second fluid F2 to each annular proportional distribution nozzle 24 may be independently controlled.

In the depicted embodiments of FIGS. 2A and 2B, because the flow rate of the second fluid F2 to each annular proportional distribution nozzle 24 is about the same, each burner element 20 operates on either side of stoichiometric depending on whether that burner element 20 is active or passive at the time. When a burner element 20 is in the active state, that burner element 20 operates off of stoichiometric, and sometimes well off of stoichiometric, in one direction, and when the burner element 20 is in the passive state, that burner element 20 operates off of stoichiometric, and sometimes well off of stoichiometric, in the opposite direction. For example, when the first fluid F1 is fuel and the second fluid F2 is oxidant, a burner element 20 in the active state will operate fuel-rich and a burner element 20 in the passive state will operate fuel-lean. Alternatively, when the first fluid F1 is oxidant and the second fluid F2 is fuel, a burner element 20 in the active state will operate fuel-lean and a burner element 20 in the passive state will operate fuel-rich. However, because the total flow of fuel and oxidant is controlled by control valves 23 and 28 (and also by a staging control valve 32), the overall stoichiometry of the burner 10 remains the same regardless which, and how many, burner elements 20 are in the active state versus the passive state.

The stoichiometry at which each burner element 20 operates may be characterized by an equivalence ratio. For a given fuel flow rate, the equivalence ratio is determined as the ratio of theoretical stoichiometric oxygen flow to actual oxygen flow. For an oxidant that is 100% oxygen, the oxygen flow equals the oxidant flow. For an oxidant that an oxygen percentage X less than 100%, the oxygen flow in an oxidant stream is determined by dividing the oxidant flow rate by the oxygen percentage X; for example, to meet an oxygen requirement of 100 SCFH using an oxidant containing 40% oxygen, 250 SCFH of the oxidant is required.

The following discussion pertains to the embodiments in which the first fluid F1 is a fuel and the second fluid F2 is an oxidant (non-staged burner) and in which the first fluid F1 is a fuel and both the second fluid F2 and the third fluid F3 are oxidants (staged burner). When a burner element 20 is in the passive state, the equivalence ratio is less than about 1, and is preferably at least about 0.2. This signifies that a passive burner element 20 is operating fuel-lean, with as much as five times the oxygen required for complete combustion. In contrast, when a burner element 20 is in the active state, the equivalence ratio is greater than about 1, and is preferably no more than about 10. This signifies that an active burner element 20 is operating fuel-rich, with as little as 10% of the oxygen required for complete combustion.

A staging ratio, in the case of a staged burner, is defined as the ratio of the amount of a reactant flowing through the staging nozzle 30 to the total amount of that reactant flowing through the annular proportional distribution nozzles 24 and the staging nozzle 30. For example, when the second fluid F2 and the third fluid F3 are oxidants, the staging ratio is the amount of oxygen provided by the staging nozzle 30 divided by the total amount of oxygen provided by the staging nozzle 30 and the annular proportional distribution nozzles 24 combined. If the second fluid F2 and the third fluid F3 are the same fluids (i.e., with the same oxygen concentration), then the staging ratio is simply the third fluid F3 flow rate divided by the sum of the second fluid F2 flow rate and the third fluid F3 flow rate. But if the second fluid F2 and the third fluid F3 are different fluids (i.e., with different oxygen concentrations X2 and X3, respectively), then the staging ratio is calculated to take into account the concentration differences, as $X_3F_3/(X_2F_2+X_3F_3)$, as would be understood by a person of skill in the art.

The staged burner 10 is preferably operated with a staging ratio of equal to or less than about 75%. For example, when oxidant is staged, i.e., when the second fluid F2 and the third fluid F3 are oxidants, at least about 25% of the oxygen to the burner 10 is flowed through the annular proportional distribution nozzles 24 and no more than about 75% of the oxygen is flowed through the staging nozzle 30. More preferably, the staged burner 10 is operated with a staging ratio of equal or less than about 40%. Further, as discussed above, because of the active or passive operation of each of the burner elements 20, the one or more burner elements 20 active at one time operate with an excess of the first fluid F1 compared to stoichiometric, and the one or more burner elements 20 that are passive at the same time operate with an excess of the second fluid F2 compared to stoichiometric, thereby providing some amount of staging even without taking into account the third fluid F3 provided by the staging nozzle 30.

Further, even the non-staged burner 11 operates with some amount of "staging" in that the active burner elements 20 operate rich in the first fluid F1 and the passive burner elements operate lean in the first fluid F1, such that some of the first fluid F1 from the active burner elements 20 combusts in a more delayed and diffuse manner with some of the second fluid F2 from the passive burner elements 20. For example, when the first fluid F1 is fuel and the second fluid F2 is oxidant, the active burner elements 20 are fuel rich and some of the excess fuel combusts with the excess oxidant from the passive burner elements 20, which are fuel lean.

The first fluid F1 exiting an active selective distribution nozzle 22 has an active jet velocity determined by the first fluid F1 flow rate and the cross-sectional area of the selective distribution nozzle 22. The second fluid F2 exiting an annular proportional distribution nozzle 24 has an annular jet velocity determined by the second fluid F2 flow rate and the cross-sectional area of the annular proportional distribution nozzle 24. In the staged burner 10, the third fluid F3 exiting the staging nozzle 30 has a staging jet velocity determined by the third fluid F3 flow rate and the cross-sectional area of the staging nozzle 30. The active jet velocity preferably is greater than the annular jet velocity for both the staged burner 10 and the non-staged burner 11.

In addition, for optimal performance of the staged burner 10, the staging jet velocity should be less than or equal to the active jet velocity, and greater than or equal to about 0.05 times the active jet velocity. In one embodiment, the ratio of the staging jet velocity to the active jet velocity is less than or equal to about 0.4. In another embodiment, the ratio of the staging jet velocity to the active jet velocity is greater than or equal to about 0.1.

In one exemplary embodiment tested in a vertical firing arrangement (roof mounted), the first fluid F1 jet velocity through an active selective distribution nozzle 22 was at least about 250 ft/s and was preferably at least about 300 ft/s, and the velocity through a passive selective distribution nozzle 22 was about 20% of the active jet velocity. For a horizontal firing arrangement, the active jet velocity can be considerably lower since there is less need to combat buoyancy effects to avoid burner block overheating.

All of the control valves 23, 26, 28, and 32 are connected to and controlled by a controller 105 that is specifically programmed or configured to operate the burner 10. The controller 105 may include conventional electronics components such as a CPU, RAM, ROM, I/O devices, and the programming or configuration of the controller 105 may be accomplished by a combination of one or more of hardware, firmware, software, and any other mechanism now known or later developed for programming operating instructions into a controller.

As described above, one of the fluids F1 and F2 must be or contain a fuel, and the other of the fluids F1 and F2 must be an oxidant or contain oxygen. In a staged burner 10, the third fluid F3 should be the same type of fluid (fuel or oxidant) as the second fluid F2. The fuel can be a gaseous fuel, a liquid fuel, or a pulverized solid fuel in a gaseous carrier. In one embodiment of a non-staged burner 11, F1 is a fuel and F2 is an oxidant. In one embodiment of s staged burner 10, F1 is a fuel and F2 and F3 are oxidants. In this case, F2 and F3 may be the same oxidant, or F2 and F3 may be different oxidants. For example, in one preferred embodiment, F1 is a gaseous fuel such as natural gas, F2 is an oxidant having an oxygen concentration of equal to or greater than about 70%, for a staged burner 10 or a non-staged burner 11. For a staged burner 10 in this embodiment, F3 is an oxidant having an oxygen concentration of equal to or greater than about 20.9%. In another similar embodiment, F1 is a gaseous fuel such as natural gas, F2 is an oxidant having an oxygen concentration greater than that of air, and in the staged burner version, F3 is air.

In an alternate embodiment, F1 is an oxidant and F2 (and F3 in the case of staging) are fuels. In this case F1 has an oxygen concentration equal to or greater than about 26%, preferably equal to or greater than about 40%, and more preferably equal to or greater than about 70%.

Figure 3:
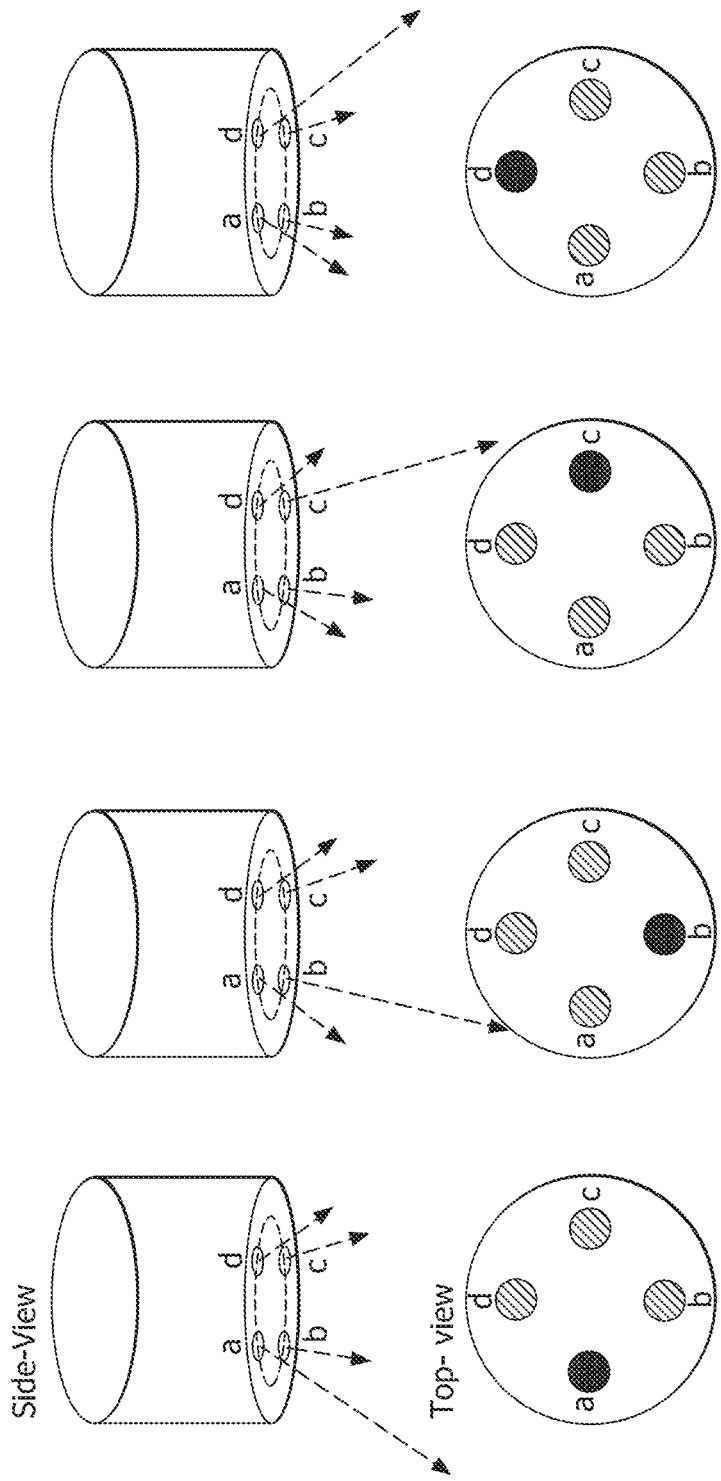
FIG. 3 is an operational sequence schematic for an embodiment of a selective burner as in FIGS. 1A and 1B.

FIG. 3 shows one possible sequence of operation for the embodiment of the burners 10 and 11 illustrated in FIGS. 1A and 1B. For purposes of discussion, the four burner elements 20 are labeled as a, b, c, and d. As shown, only one burner element 20 is active at a time, while the remaining burner elements 20 are passive, and each burner element 20 is successively switched to the active state when the previously active burner element 20 is returned to the passive state.

In particular, in the depicted embodiment, burner element 20a is active while burner elements 20b, 20c, and 20d are passive. In other words, each of the annular nozzles 24 in each burner element 20 is receiving an approximately equal flow of the second fluid F2, and only the selective distribution nozzle 22 in burner element 20a is receiving a higher active flow of the first fluid F1, while the selective distribution nozzles 22 in the other burner elements 20b, 20c, and 20d are receiving a lower passive flow of the first fluid F1. This results in a relatively long, penetrating flame emanating from the active burner element 20a and relatively short (pilot) flames emanating from the passive burner elements 20b, 20c, and 20d. As further shown in the depicted embodiment, when burner element 20b becomes active, burner element 20a returns to the passive state and burner elements 20c and 20d remain passive. Next, when burner element 20c becomes active, burner element 20b returns to the passive state and burner elements 20c and 20a remain passive. Finally, when burner element 20d becomes active, burner element 20d returns to the passive state and burner elements 20a and 20b remain passive.

The sequence shown in FIG. 3 and described above is only one of essentially limitless variations. In one non-limiting example, one burner element 20 is active at a time in a repeating sequence such as a-b-c-d or a-b-d-c or a-c-b-d or a-c-d-b. In another non-limiting example, one burner element 20 is active at a time in a random sequence. In yet another non-limiting example, one burner element 20 is active at a time but each for either the same or different lengths of time.

Further, in other examples, more than one burner element 20 is active at a time. For example, for a burner 10 having three or more burner elements 20, two burner elements 20 may be active and the remainder passive. In general, for a burner 10 having n burner elements, any number of burner elements from 1 to n−1 may be active, and the remainder passive.

Each burner element 20 can be switched from the passive to the active state based on a preprogrammed time sequence, according to a predetermined algorithm, according to a random sequence, depending on furnace conditions, or synchronized with other cyclical or periodic events in the furnace. One or more sensors 195 may be positioned in the furnace for sensing any parameter that may be relevant to determining locations where more or less combustion heat is needed. For example, the sensor may be a temperature sensor, such that when the temperature sensor is below a threshold setting, the burner element 20 oriented to heat the furnace in the region of that temperatures sensor may be made active more frequently or for longer periods of time. Or if a temperature sensor detects that a portion of the furnace or charge is receiving insufficient heat, one or more burner elements 20 positioned near that portion of the furnace or angled toward that portion of the charge can be switched to the active state, while burner elements 20 in portions of the furnace receiving excess heat can be switched to the passive state. With specific regard to a regenerative furnace, temperature sensors, such as optical sensors, can detect the temperature of the charge in various parts of the furnace and to detect regions in need of additional heat, such as all or portions of the cold spot 122, and burner elements 20 targeted to those regions can be made active for longer periods of time or more frequently to increase the temperature of those regions.

Temperatures sensors may include contact sensors such as thermocouples or RTDs located in the furnace walls, or non-contact sensors such as infrared sensors, radiation sensors, optical sensors, cameras, color sensors, or other sensors available to those in the industry. Other types of sensors may also be used to indicate the level of melting or heating in the furnace, including but not limited to proximity sensors (e.g., to sense the proximity of solid charge that has yet to melt) or conductivity sensors (e.g., to detect the higher conductivity of a liquid as compared to chunks of poorly interconnected solids).

Several benefits can be achieved by operation of the burner 10 or the burner 11 as described herein. Because heat can be preferentially directed to certain locations and for longer or shorter periods of time, cold spots in the furnace can be identified and eliminated, resulting in more uniform heating and melting. Particularly for vertical firing arrangements (i.e., roof-mounted burners pointing downward) as in FIG. 7 or FIG. 15, operating the burner with less than all of the burner elements 20 in active mode reduces or eliminates the hazards of buoyant flames, thereby avoiding overheating of the burner block and furnace roof. The fuel-rich combustion resulting from an active burner element 20, where the oxygen provided through the annular proportional distribution nozzle 24 is significantly less than the stoichiometric oxygen required by the fuel provided through the selective distribution nozzle 22, creates a non-oxidizing atmosphere near the melt bath to help protect the charge from undesirable oxidation. Additionally, activating the burner elements 20 in a repeated cyclical pattern can b used to generate a vortex heating pattern that increases residence time of combustion gases, increases heat transfer rates, and improves uniformity of heating, as shown for example in US 2013/00954437. Further, selective activation of burner elements 20 and variation of the staging ratio can be used to adjust the location of maximum heat flux emanating from the combustion reactions and to adjust flame coverage to accommodate various furnace geometries, conditions, and charge levels.

Figure 5B:
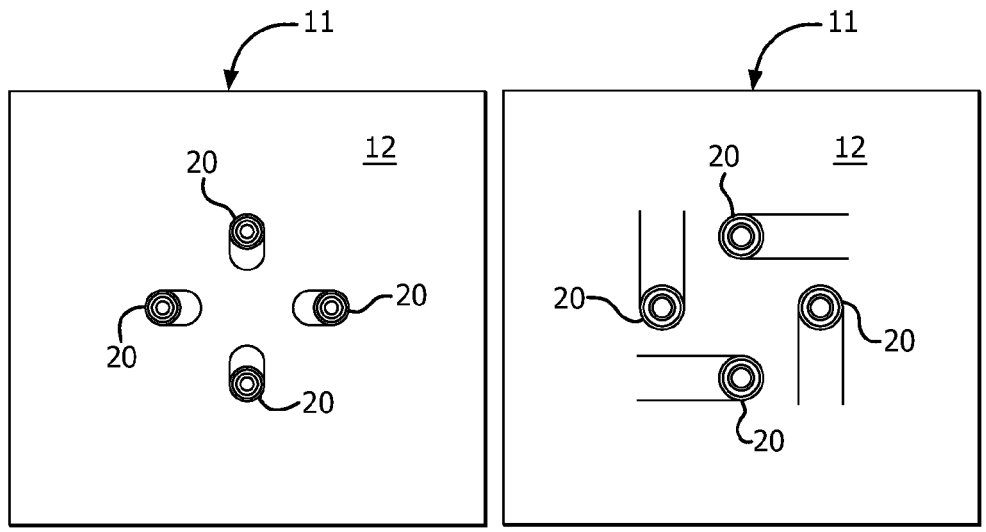
FIGS. 5B(a)-5B(f) are end views of various embodiments of a selective burner without staging.
Figure 5B:
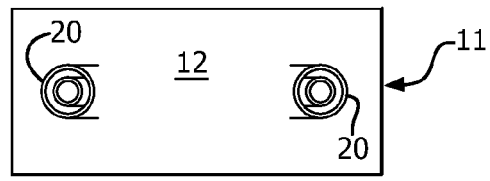
Figure 5B:
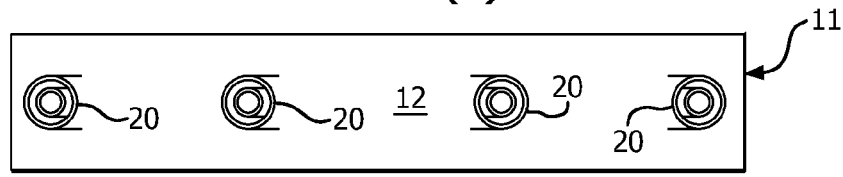
Figure 5B:
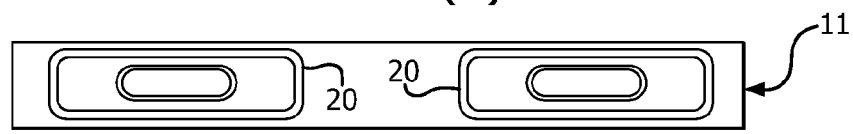
Figure 5B:
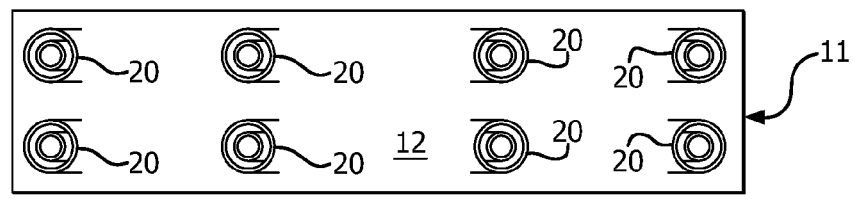

Various possible configurations of the staged burner 10 and non-staged burner 11 include those shown in FIGS. 5A and 5B. In an embodiment of the type shown in FIGS. 5A(a) and 5B(a), one or more of the burner elements 20 may be angled radially outward at an angle $\alpha$ from the circle circumscribed by the burner elements 20, or from an axis perpendicular to the burner block 12 or an axis defined by the staging nozzle 30. Although the depicted embodiment shows all four burner elements 20 angled radially outward at the same angle $\alpha$, it is understood that each burner element 20 may be angled at a different angle $\alpha_n$ depending on the furnace geometry and desired operating characteristics of the burner 10. The angle $\alpha$ may be equal to or greater than about 0° and is preferably non-zero and equal to or less than about 75° (or, stated otherwise, the complimentary angle measured from the plane of the burner face 14 is from about 15° to about or slightly less than 90°). Preferably, the angle $\alpha$ is equal to or less than about 60°. More preferably, the angle $\alpha$ is at least about 10° and no greater than about 40°.

In an embodiment of the type shown in FIGS. 5A(b) and 5B(b), one or more burner elements 20 may be angled tangentially to the circumscribed circle at an angle $\beta$ to create swirl. Although the depicted embodiment shows all four burner elements 20 angled tangentially at the same angle $\beta$, it is understood that each burner element 20 may be angled at a different angle $\beta_n$ depending on the furnace geometry and desired operating characteristics of the burner 10. The angle $\beta$ may be equal to or greater than about 0° and is preferably equal to or less than about 60°. More preferably, the angle $\beta$ is at least about 10° and no greater than about 40°.

In an embodiment of the type shown in FIGS. 5A(c) and 5B(d), a plurality of burner elements 20 are positioned generally collinearly with each other to define a line having a midpoint and ends. Although four burner elements 20 are shown, this embodiment is applicable to a configuration with at least two burner elements 20 (for example as shown in FIG. 5B(c) for a non-staged burner) and up to as many burner elements 20 as may be required in a particular furnace. In a staged burner, a staging nozzle 30 is positioned between each adjacent pair of burner elements 20, so that the burner elements 20 and staging nozzles 30 alternate. For example, an arrangement with two burner elements 20 has one staging nozzle 30 positioned between the two burner elements 20, and an arrangement with three burner elements 20 has two staging nozzles 30 each positioned between a pair of adjacent burner elements 20. The burner elements 20 may all be oriented perpendicularly to the burner face 14, or some or all of the burner elements 20 may be angled outward at an angle $\gamma$ of less than or equal to about 45° from the line midpoint toward one of the line ends. Similarly, the staging nozzles 30 may be oriented perpendicularly to the burner face 14, or some or all of the staging nozzles 30 may be angled in one direction or the other along the line. In the depicted embodiment, a central staging nozzle 30 is oriented perpendicularly to the burner face 14, and a series of three collinear elements—a burner element 20, a staging nozzle 30, and another burner element 20—are positioned diametrically to either side and angled away from the central staging nozzle 30 and toward their respective ends of the line.

In an embodiment of the type shown in FIGS. 5A(d) and 5B(d), a plurality of burner elements 20 are positioned collinearly with each other to define a line having a midpoint and ends. Although four burner elements 20 are shown, this configuration is application to a configuration with at least two burner elements 20 and up to as many burner elements 20 as may be required in a particular furnace. In a staged burner, an elongated or generally rectangular staging nozzle 30 having a major axis at least 1.5 times as long as a minor axis is positioned adjacent to and spaced apart by a fixed distance from the burner elements 20, with the major axis substantially parallel to the line defined by the burner elements 20. The burner elements 20 may all be oriented perpendicularly to the burner face 14, or some or all of the burner elements 20 may be angled outward at an angle $\gamma$ of less than or equal to about 45° from the line midpoint toward one of the line ends.

In an embodiment of the type shown in FIGS. 5A(e) and 5B(e), each burner element 20 has a flat-flame configuration, wherein both the selective distribution nozzle 22 and the annular nozzle 24 have an elongated or generally rectangular configuration having a major axis at least 1.5 times as long as a minor axis. This type of flat flame burner is described in detail, for example in U.S. Pat. No. 5,611,682. In staged burner, at least two staging nozzles 30 are positioned adjacent to and spaced apart from the burner element 20, and are oriented generally collinearly to define a line that is substantially parallel to the major axis of the burner element 20. At least two burner elements 20 are utilized in this configuration.

In any of the above-described configurations in FIGS. 5A and 5B, a selective operation scheme can be implemented similar to that describe above for the configuration of FIGS. 1A and 1B. Specifically, at any given time, at least one burner element 20 is operated in an active state, wherein the fluid flow through an active selective distribution nozzle 22 is greater than the average fluid flow through all of the selective distribution nozzles 22, while at least one burner 20 is operated in the passive stage, wherein the fluid flow through a passive selective distribution nozzle 22 is less than the average fluid flow through all of the selective distribution nozzles 22.

Figure 11A:
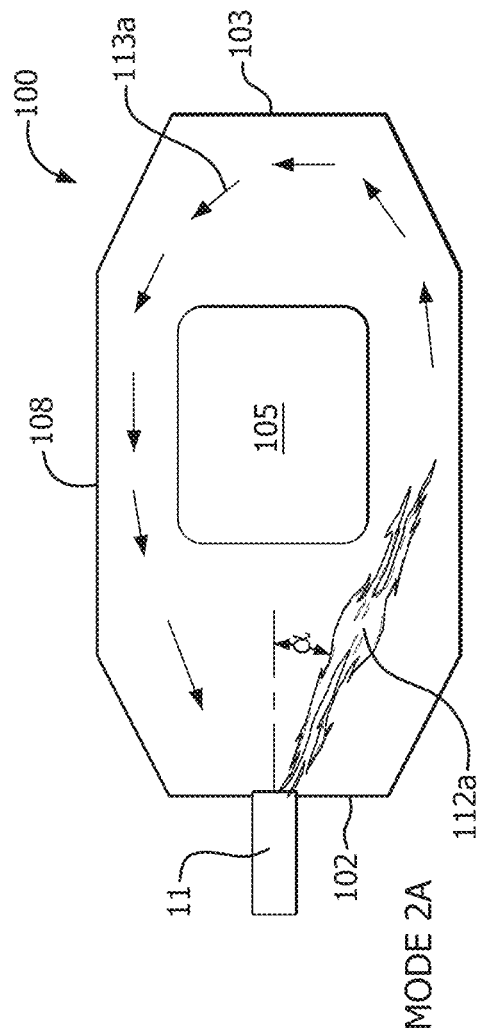
FIGS. 11A and 11B are each a cutaway top view of a double-pass rotary furnace with an embodiment of a selective burner mounted in the charge door showing flames directed to avoid a chunk of charge in the furnace and to create a flow of combustion products around the charge so as to pass through the back portion of the furnace. The selective burner has at least two burner elements, one oriented direct a flame toward each side of the furnace.
Figure 11B:
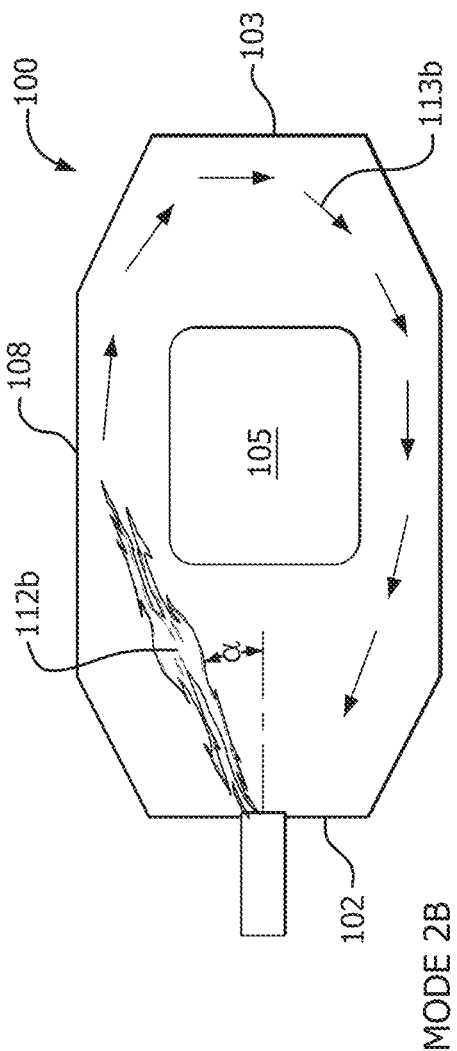
Figure 12:
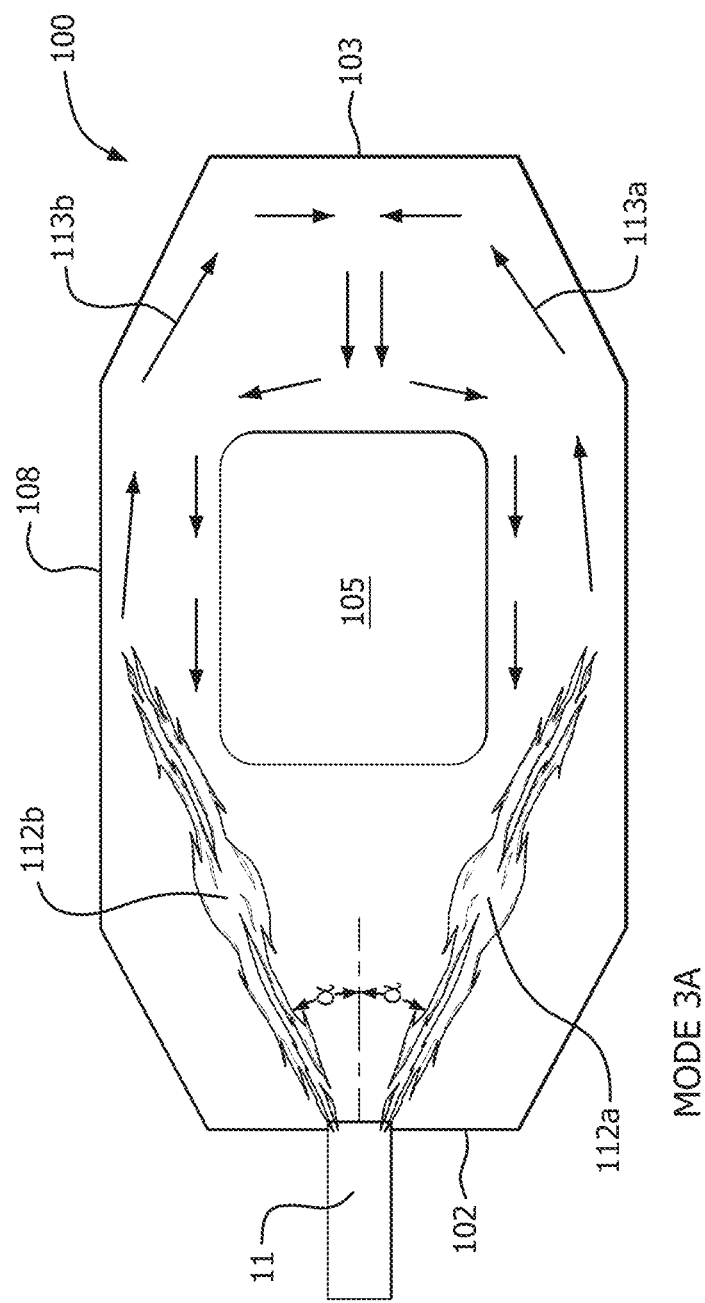
FIG. 12 is a cutaway top view of a double-pass rotary furnace with an embodiment of a selective burner mounted in the charge door as in FIGS. 11A and 11B, showing a flow pattern when burner elements are active to direct flames toward both sides of the furnace simultaneously.

FIGS. 10, 11A, 11B, 12, 13A, 13B, and 14 show various modes of operation that may be achieved using a burner 11, for example as shown in FIG. 5C(a), FIG. 5C(b), or FIG. 5C(c), having a central burner element 20 oriented generally along the axial direction of the burner 11 (i.e., generally perpendicular to the burner face 14), and at least one pair of symmetric side burner elements 20 having one burner element 20 positioned laterally on either side of the central burner element 20 and angled outward. In an embodiment such as in FIG. 5C(c), the inner pair of angled burner elements 20 closer to the central burner element 20 may be angled outward at a shallower angle than the outer pair of angled burner elements 20 farther from the central burner element 20. Similarly, operating modes such as shown in FIGS. 11A, 11B, and 12 can be achieved using a burner 11 as shown in FIG. 5B(c), (d), 5B(e), 5B(f), 5C(b), or 5C(c), while operating modes such as shown in FIGS. 11A, 11B, 12, 13A, 13B, and 14 can be achieved using a burner 11 as shown in FIG. 5B(d), 5B(f), or 5C(c). For example the inner pair may be angled outward at a first angle α from about 10° to about 45°, and preferably from about 15° to about 30°, while the outer pair may be angled outward at a second angle α from about 15° to about 75°, and preferably from about 30° to about 60°, as measured form the burner axial direction.

In addition, the several burner elements can be angled downward toward the charge at different angles. The central burner element 20 may be generally parallel to the burner axis (or generally perpendicular to the burner face 14), while the inner pair of angled burner elements 20 may be angled downward at a first angle θ from about 0° to about 60° and the outer pair of angled burner elements 20 may be angled downward at a second angle θ from about 0° to about 60°. In one embodiment, the inner pair of angled burner elements 20 is angled downward from about 30° to about 60° to be able to heat solid charge remaining in the furnace near the charge door, while the outer pair of burner elements 20 is angled downward from about 10° to about 45° to impinge the charge surface along the furnace sidewall.

In a first mode of operation (Mode 1) as in FIG. 10, only the central burner element 20 is active while the multiple angled burner elements 20 are passive. This mode is the same as the prior art mode of FIG. 7, and produces a single flame 112. If there is a large chunk of charge 105 (or multiple sizeable pieces of solid charge) in the center of the furnace 100, as shown, the flame 112 from the active central burner element 20 will impinge the chunk 105 and then take the path of least resistance, with the fuel and oxidant (incomplete combustion products) 113 short-circuiting out of the flue gas duct 110. This leads to uneven heat distribution in the furnace 100, in which the front portion 114 of the furnace 100 is overheated, the flue gas temperatures are increased, and the rear portion 118 of the furnace 100 is cold. While the heat transfer from the flame 112 to the ingot 105 is high because of direct impingement, this can lead to issues such as overheating and oxidation. Potential overheating and problems due to charge in the center of the furnace 100 while operating in Mode 1 can be detected by measuring the temperature of the charge door 102, the temperature of the flue gas duct 110, the temperature in the rear portion 118 of the furnace 100, and/or one or more exhaust properties, such as the exhaust composition of the flue gas. Therefore, although this mode of operation may be beneficial for a short period of time with the flame impinging solid charge, it will be desirable to switch the central burner element 20 to passive and switch one or more other burner elements 20 to active when the charge door 102 and/or flue gas duct 110 show signs of overheating and/or the temperature in the rear portion 118 of the furnace 100 shows signs of insufficient heating.

In a second mode of operation (Mode 2A or Mode 2A) as in FIGS. 11A and 11B, the central burner element 20 is passive while one of the angled burner elements 20 is active to create an angled flame 112a. In one example, in a burner 11 as in FIG. 5C(b), as illustrated, one burner element 20 is active and two burner elements 20 are passive. Alternatively, in another example, in a burner 11 as in FIG. 5C(c), one burner element 20 is active and four burner elements 20 are passive. Other exemplary burners 11 can be used to create the same flame patterns. Note that in this mode, the central burner element 20 can also be cycled between active and passive while keeping the other burner elements 20 in their same state. This mode of operation allows the active flames 112a, 112b to bypass solid charge 105 in the center of the furnace 110 so that heat can reach the rear portion 118 of the furnace 110. As shown in FIGS. 11A and 11B, a circulation of combustion products 113a, 113b may be created in either direction along the furnace walls 108 and around the solid charge 105, to provide good heat transfer convective heat transfer throughout the furnace 100 to both the charge 104, 105 and the furnace walls 108. Penetration of the additional flames 112a, 112b into the furnace 100 is greatly improved as compared to Mode 1 with flame 112 alone, and overall breathing of the furnace 100 (flow from the burner 11 through the furnace headspace 106 to the flue gas duct 110) is improved. Moreover, by cycling back and forth between Mode 2A and Mode 2B, high levels of furnace temperature uniformity may be achieved.

Figure 7:
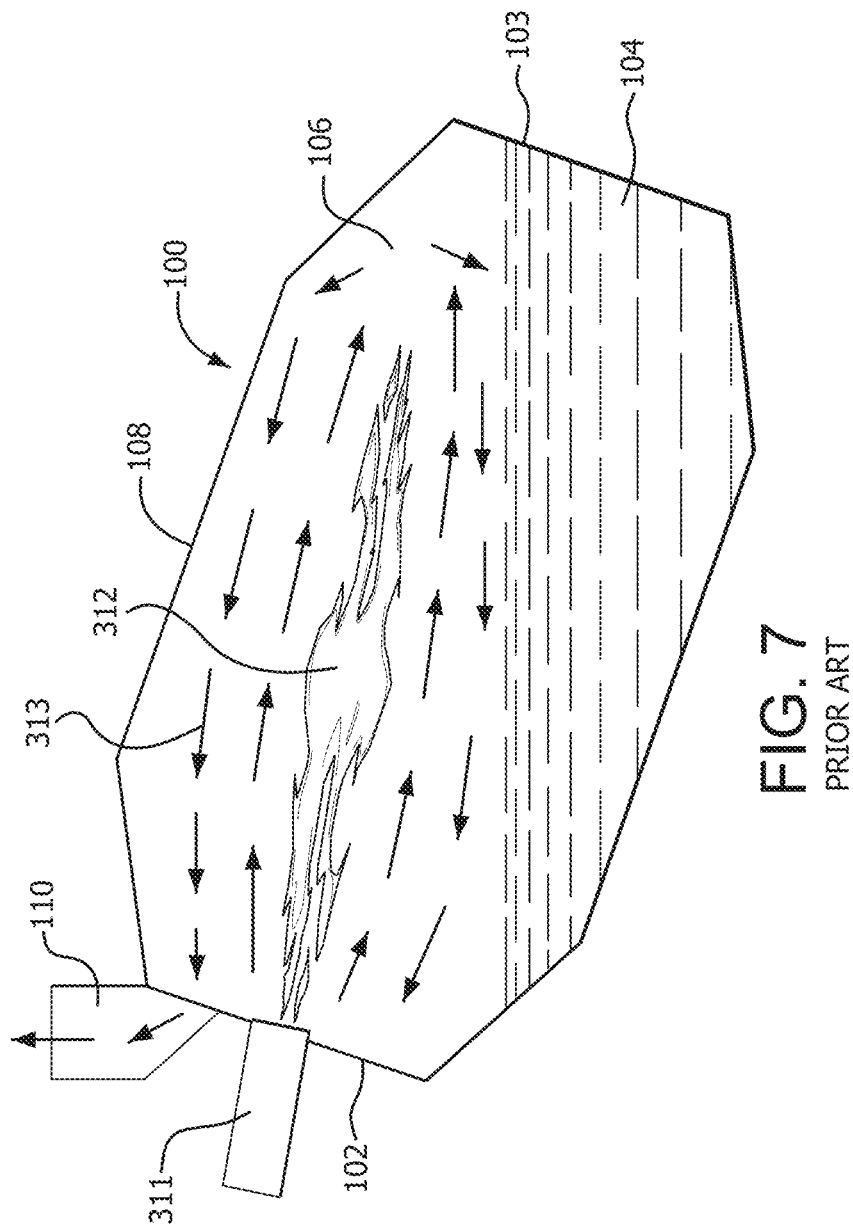
FIG. 7 is a cutaway side view of a double-pass rotary furnace having a conventional oxy-fuel burner mounted in the charge door and firing in a conventional manner.
Figure 8:
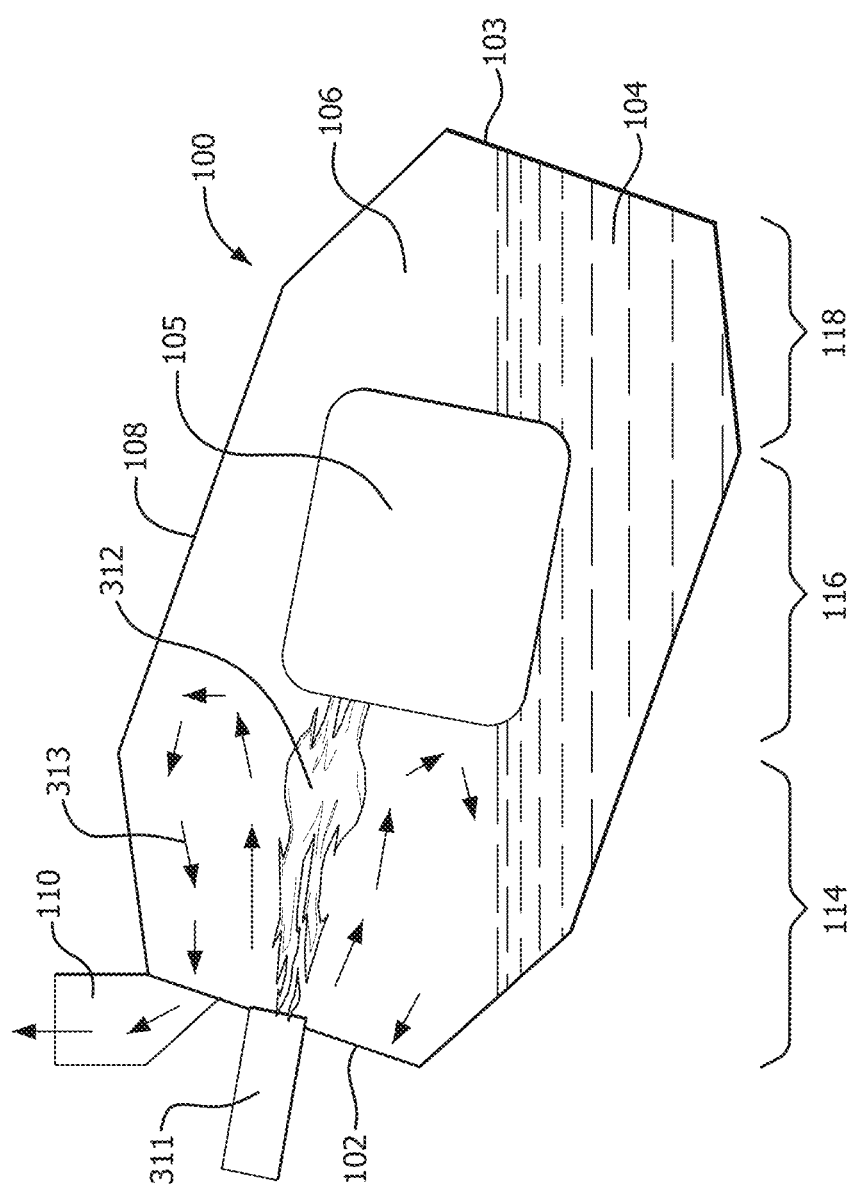
FIG. 8 is a cutaway side view of a double-pass rotary furnace as in FIG. 7 with a large chunk of charge in the furnace, showing a conventional flame impinging on the large chunk causing short circuiting of combustion products out the flue, potential overheating and yield loss on the large chunk, potential overheating of a front portion of the furnace, including the charge door, and insufficient heating of a back portion of the furnace.
Figure 15A:
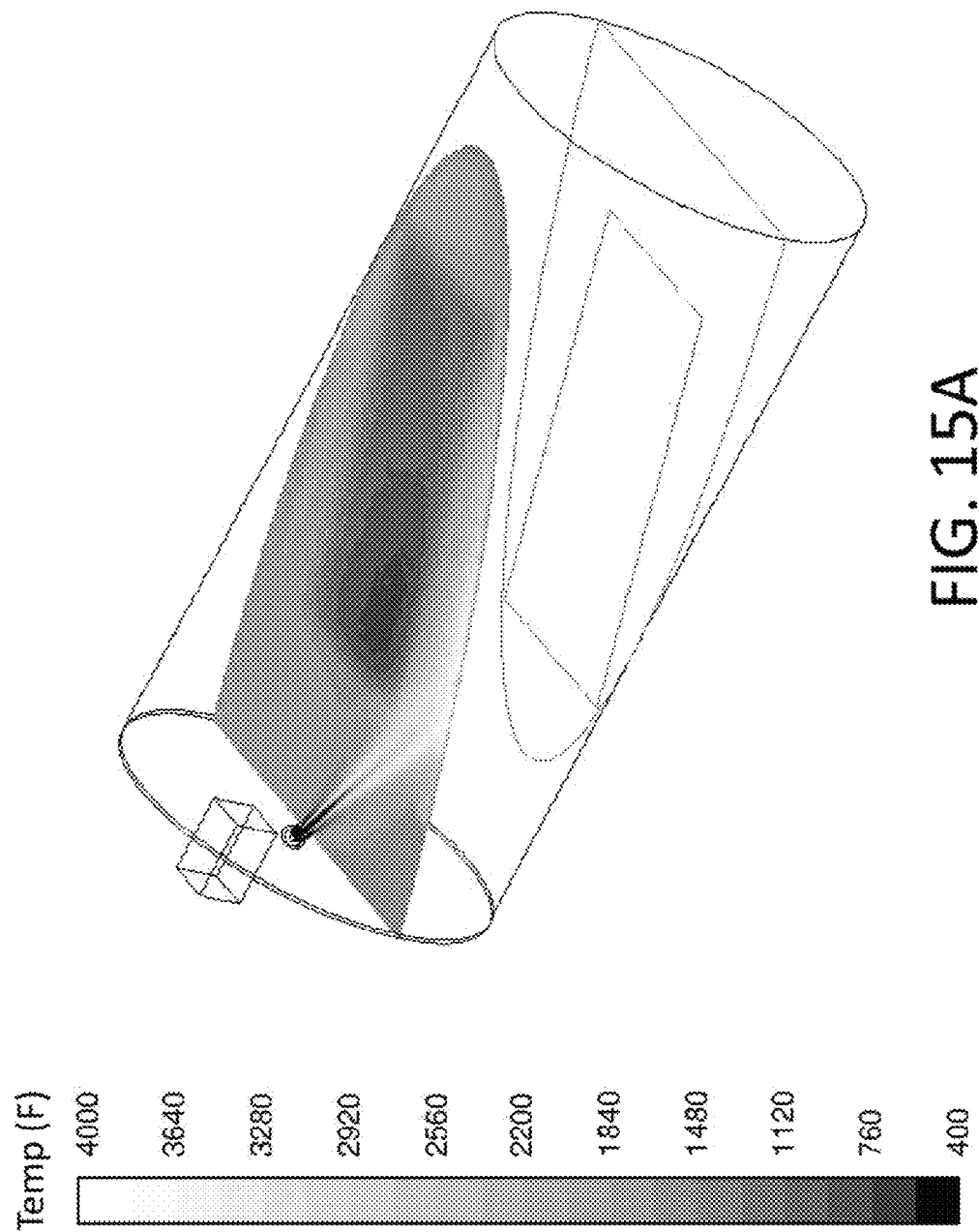
FIGS. 15A-15C are graphics showing a the results of computational fluid dynamic simulations of a furnace with an embodiment of a selective burner as in FIGS. 11A and 11B having one burner element firing toward one side of the furnace when a large chunk of charge is in the furnace; these figures can be compared directly with the simulation results of FIGS. 9A-9C for a furnace with a conventional burner.
Figure 15B:
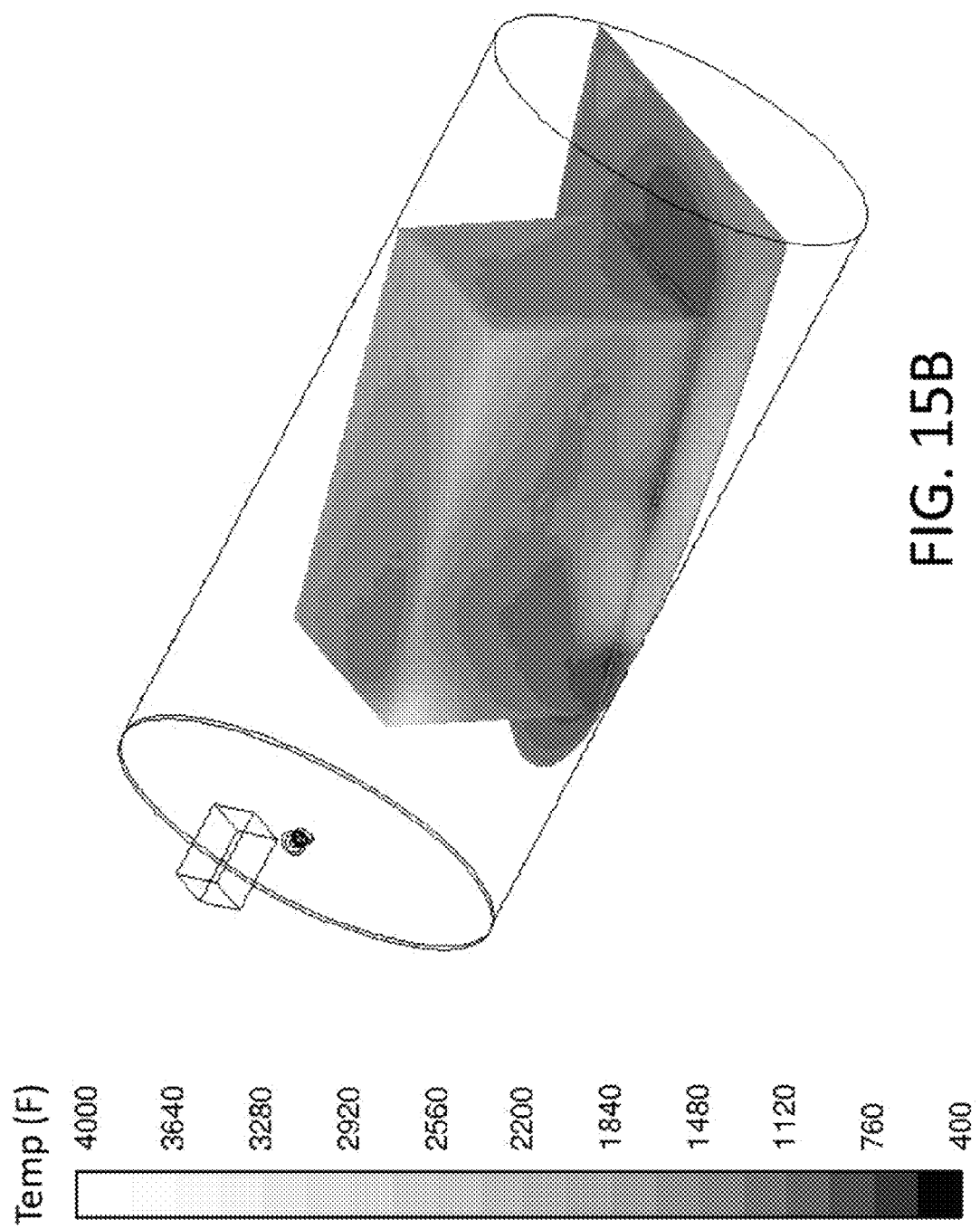
Figure 15C:
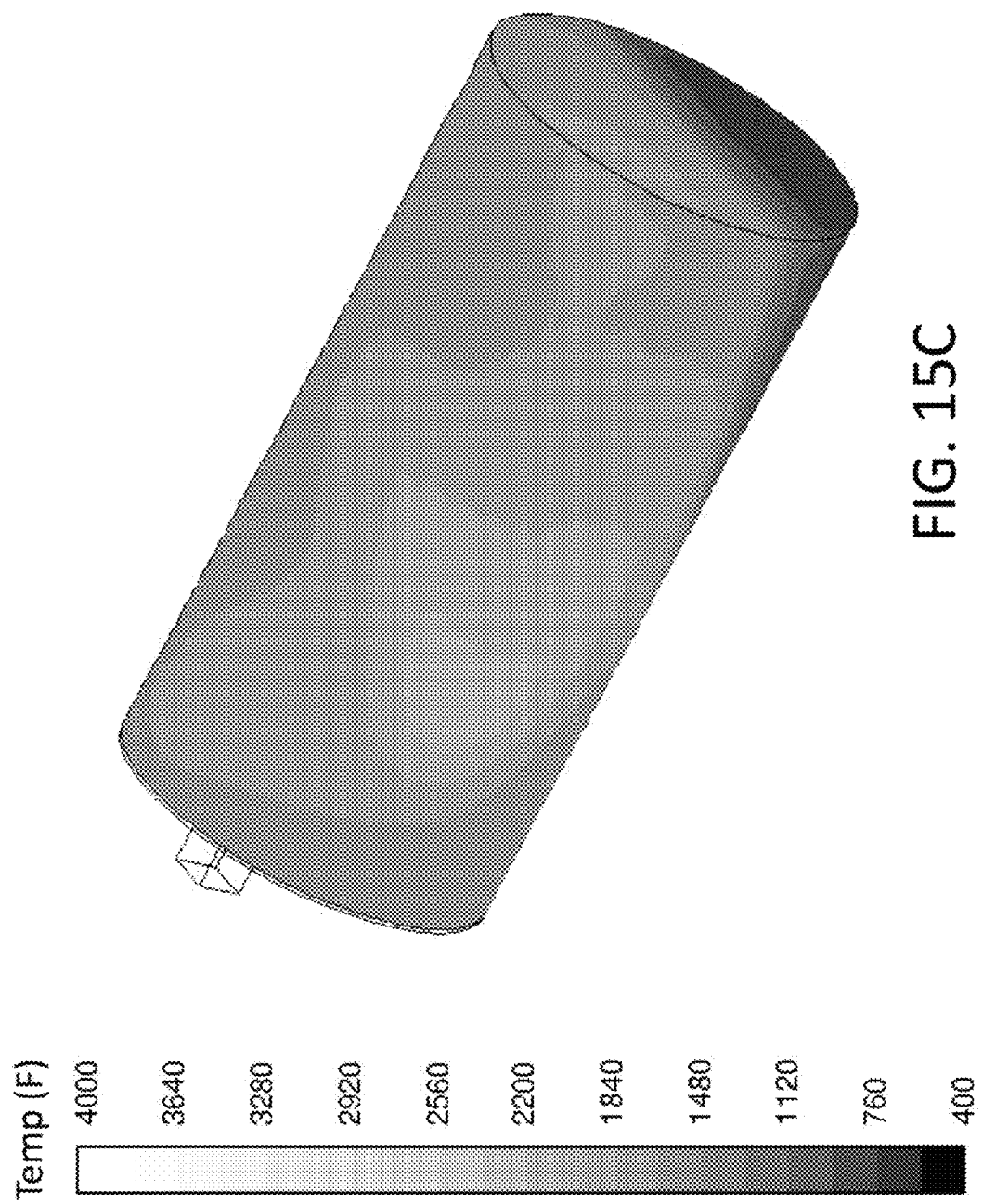

FIGS. 9A-9C and 15A-15C show a comparison of the temperature maps for a prior art system as in FIG. 7 that operate continuously in Mode 1 (FIGS. 9A-9C), versus temperature maps of a system operation in Mode 2A (FIGS. 15A-15C). Comparing FIG. 9A with FIG. 15A shows that in Mode 2A, a much higher flame temperature is achieved than in Mode 1, since the flame in Mode 2a is given space to fully develop between the solid charge 105 and the furnace wall 108, instead of being short-circuited as in Mode 1.

Figure 9A:
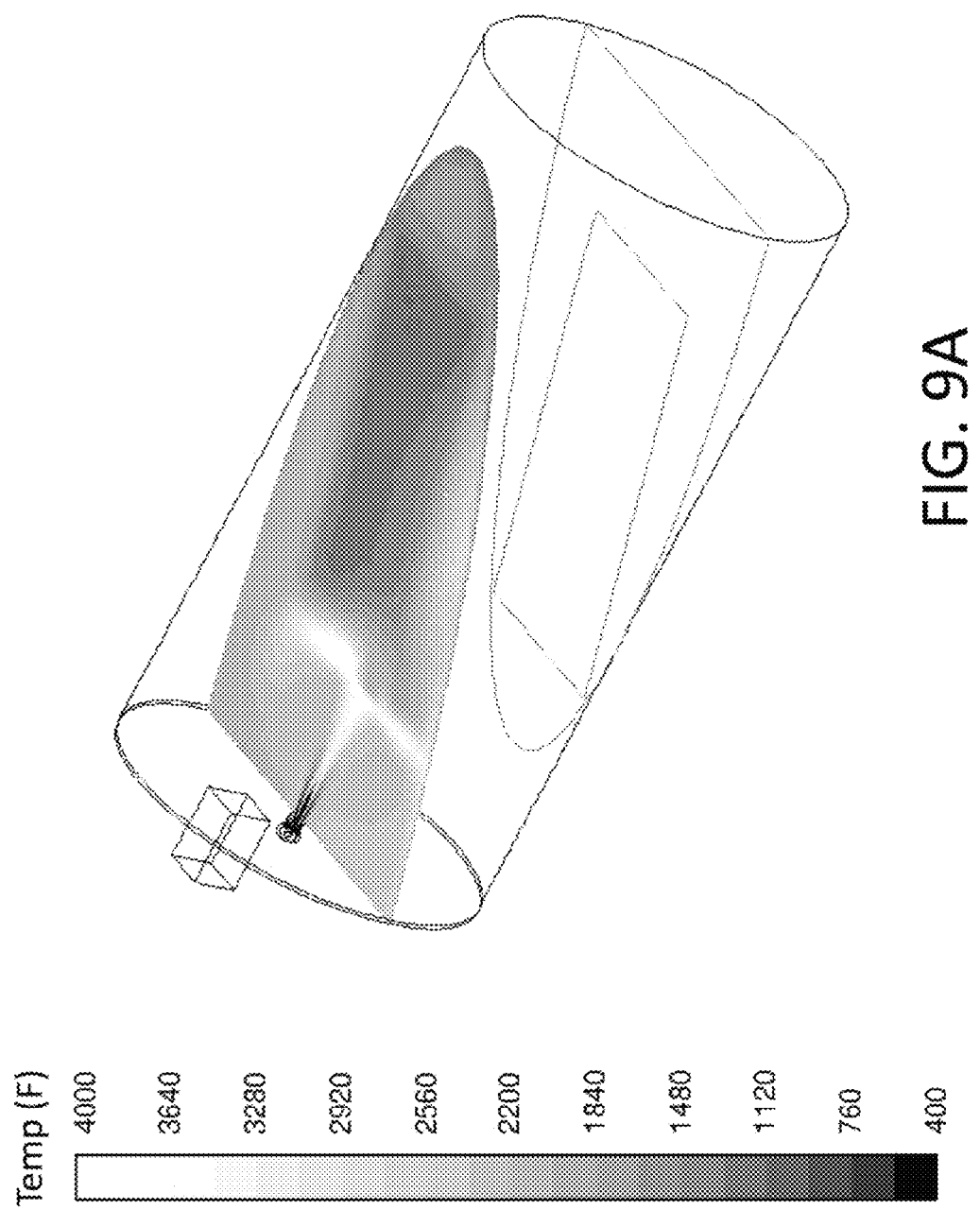
FIGS. 9A-9C are graphics showing the results of computational fluid dynamic simulations of the furnace of FIG. 8 in which a conventional flame impinges on a large chunk of charge in the furnace.
Figure 9B:
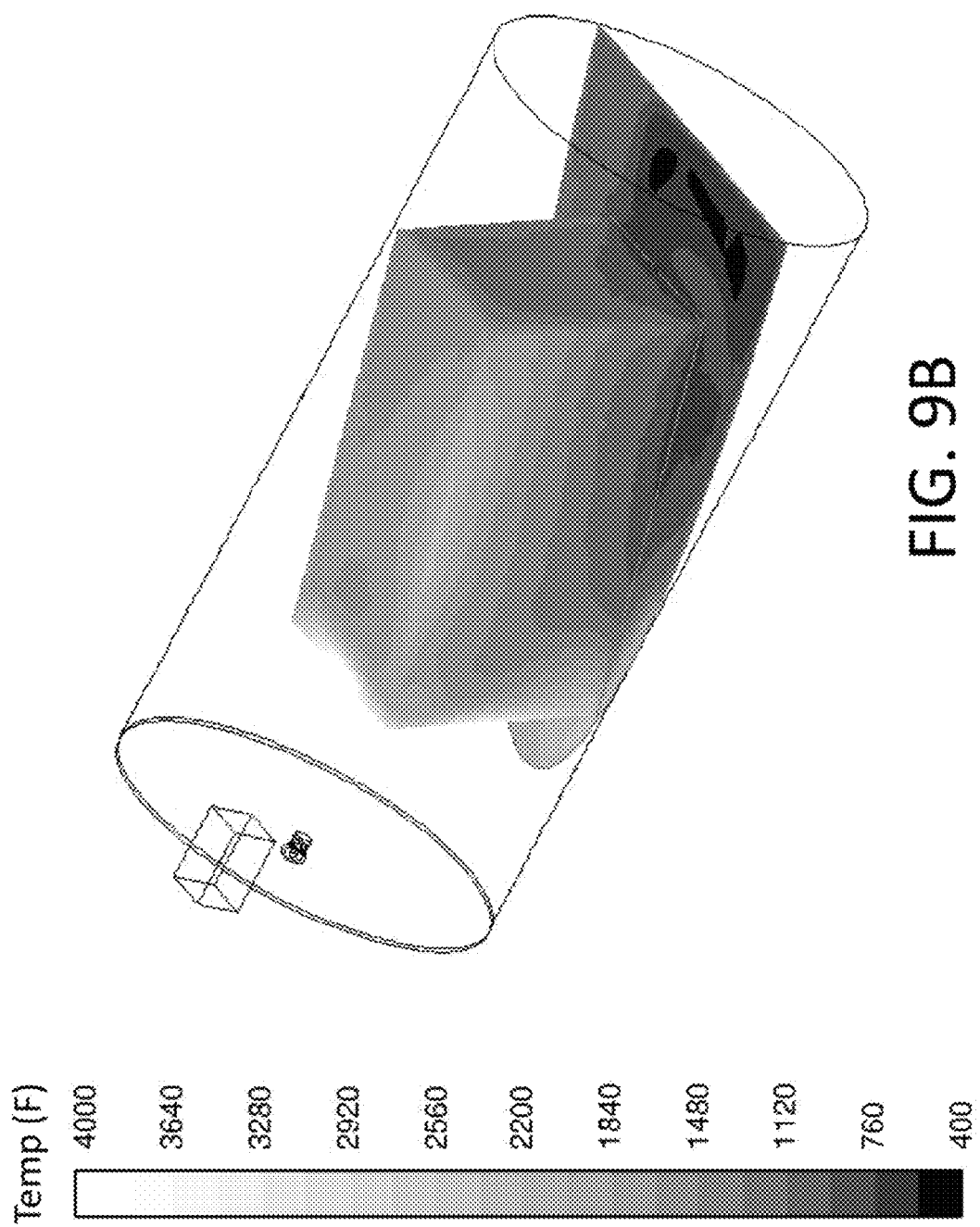

As a result, comparing FIG. 9B with FIG. 15B shows that in Mode 2A, the front of the solid charge 105 is not overheated while significantly more heat reaches the rear of the solid charge as well as the molten charge 104 in the rear portion 118 of the furnace, as compared with Mode 1 in which the front of the solid charge 105 was overheated and the remainder of the charge 104, 105 was relatively cold.

Figure 9C:
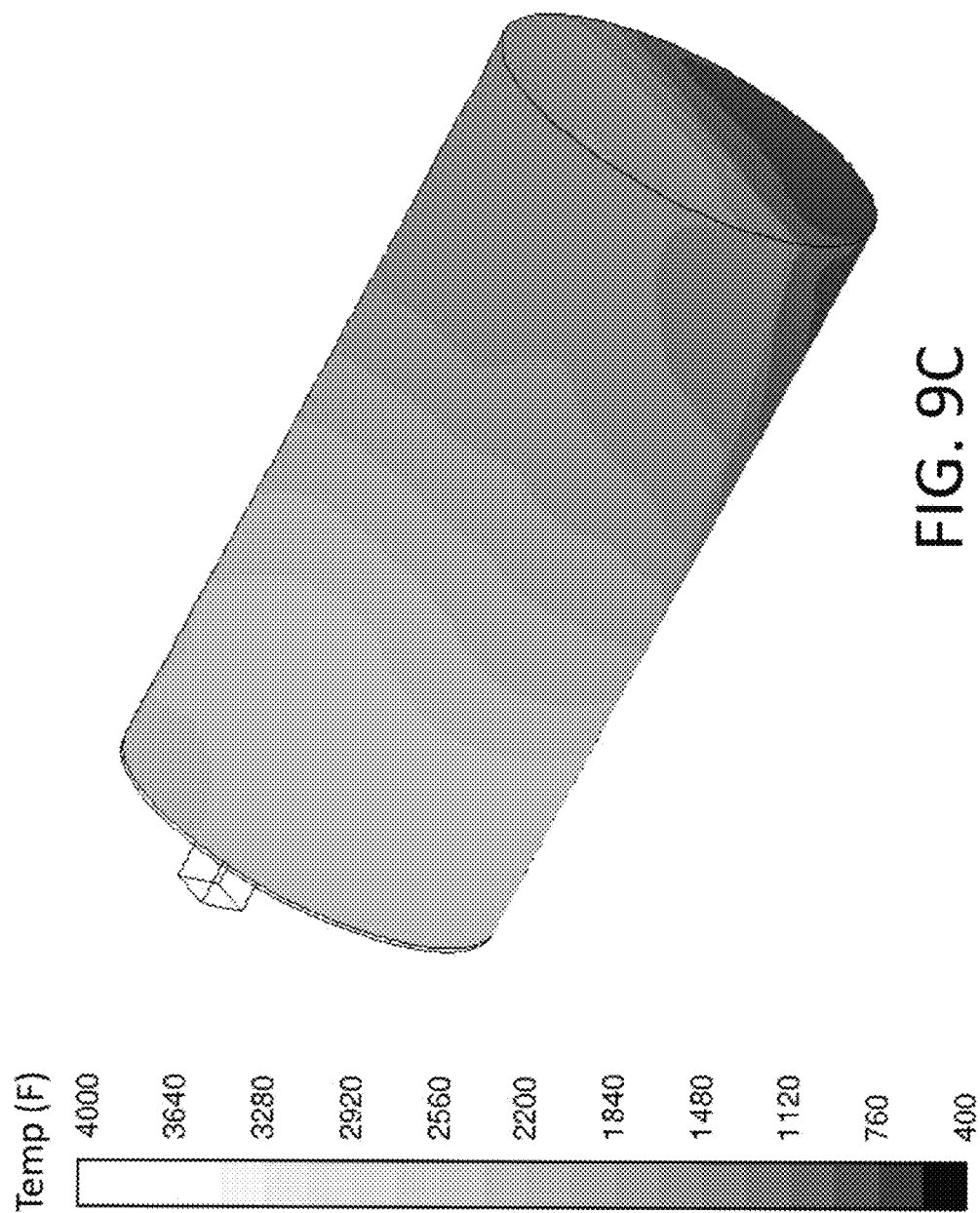

Similarly, comparing FIG. 9C with FIG. 15C shows that in Mode 2A, the furnace wall temperature is relatively uniform through the entire furnace 100, with a slight warm spot where the flame impinges the wall 108, as compared with Mode 1 in which only the front portion 112 of the furnace wall 108 was warm while the rear portion 118 of the furnace wall 108 was cold.

Thus, a vast improvement in solid charge heating and melting, charge temperature uniformity (and thus reduce loss of charge from overheating), and furnace wall temperature uniformity (and thus more uniform and more rapid hating of the charge) can be achieve by operating in Mode 2A or Mode 2A. Moreover, by cycling between Modes 1, and Modes 2A/2B, the benefits of both modes can be achieved, based on various sensed process parameters, to optimize the melting and heating rate of charge in the furnace while reduce product loss and refractory damage due to overheating.

In a third mode of operation (Mode 3A) as in FIG. 12, both of a pair of angled side burner elements 20 are active simultaneously, while the central burner element 20 is passive, thereby creating two symmetric angled flames 112a and 112b on either side of the furnace 100. This mode still allows each flame 112a, 112b sufficient space to fully develop, and can result in faster heating times that using Mode 2a or Mode 2b alone or sequentially.

Figure 13A:
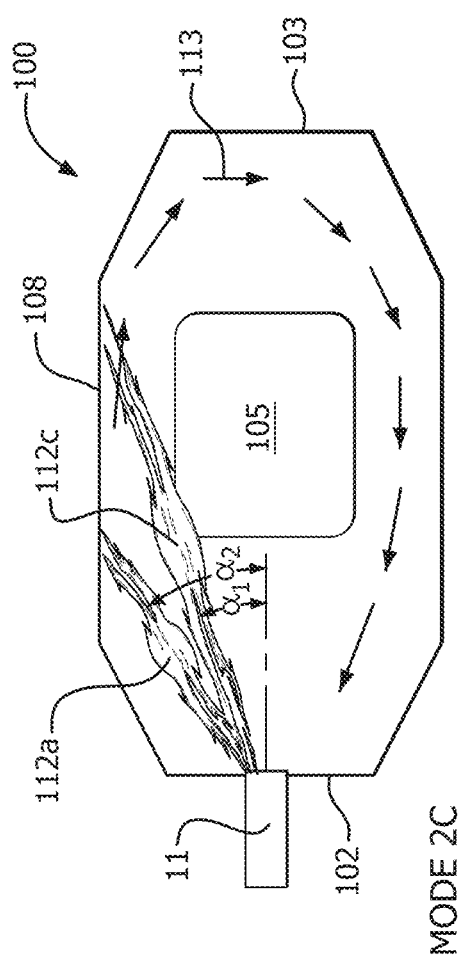
FIGS. 13A and 13B are each a cutaway top view of a double-pass rotary furnace with an embodiment of a selective burner mounted in the charge door showing flames directed to avoid a chunk of charge in the furnace and to create a flow of combustion products around the charge so as to pass through the back portion of the furnace. The selective burner has at least four burner elements, with two oriented direct flames at different angles toward each side of the furnace.
Figure 13B:
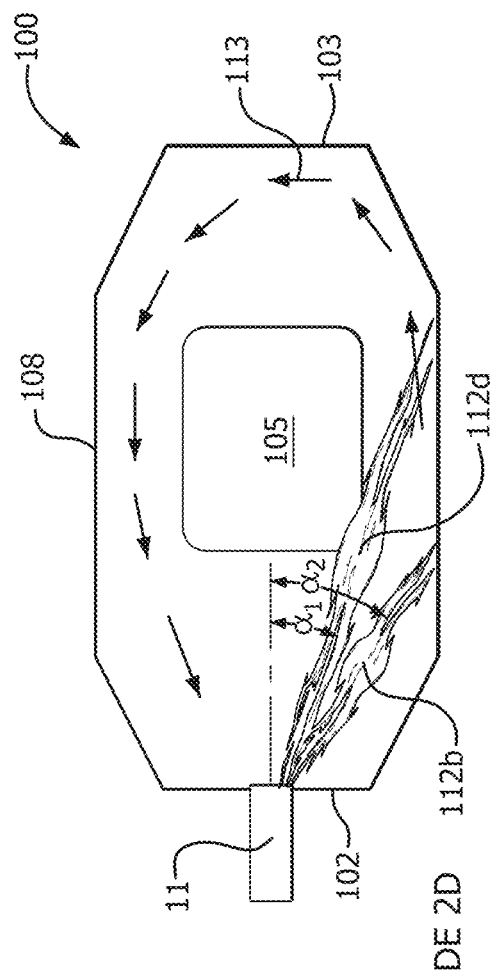

In a variation of the second mode of operation (Modes 2C and 2D) as in FIGS. 13A and 13B, using a burner as in FIG. 5B(d), 5B(f), or 5C(c), the central burner element 20 is passive while one of the angled burner elements 20 of both symmetric pairs of side burner elements 20 are active. As shown, two angled burner elements 20 on the same side of the furnace are active while the central burner element 20 and two angled burner elements 20 on the other side of the furnace are passive. In Mode 2C, this creates two differently angled flames 112a and 112c on one side of the furnace 100, while in Mode 2D, this creates two differently angled flames 112b and 112d on an opposite side of the furnace 100. Note that in these modes, the central burner element 20 can also be cycled between active and passive while keeping the other burner elements 20 in their same state. As in Modes 2A/2B, Modes 2C/2D of operation allows the active flame to bypass solid charge 105 in the center of the furnace 100 so that heat can reach the rear portion 118 of the furnace 100. As shown in FIGS. 13A and 13B, a circulation of combustion products 113 may be created in either direction along the furnace walls and around the solid charge, to provide good heat transfer convective heat transfer throughout the furnace to both the charge and the furnace walls. Penetration of the flame into the furnace is greatly improved as compared to Mode 1, and overall breathing of the furnace (flow from the burner through the furnace to the flue gas duct) is improved. Moreover, by cycling back and forth between Mode 2C and Mode 2D, high levels of furnace temperature uniformity may be achieved. In addition, of the inner and outer angled burner elements 20 are angled downward at different angles, different areas of potentially unmelted charge can be targeted by the flames 112a and 112b as compared with flames 112c and 112d, with one set of burners being angled to hit charge closer to the front end 102 of the furnace 100 than the other.

In a variation of the third mode of operation (Mode 3B) as in FIG. 14, two pairs of angled side burner elements 20 are active simultaneously, while the central burner element 20 is passive. This mode still allows each flame sufficient space to fully develop, and can result in faster heating times that using Mode 2c or Mode 2d alone or sequentially. As shown, flames 112a, 112b, 112c, and 112d are active simultaneously.

FIG. 16 shows an end view of a burner 11 as in FIG. 5C(a) or FIG. 5C(e) as viewed from the rear end 103 of the furnace 100 looking toward the charge door 102, and showing projected cross-sections of flames 120, 122a, 122b, 124 from each of the burner elements 20. The burner 11 has a central burner element 20 oriented to produce a flame 120 that will impinge solid charge 105 in the center of the furnace 100, a pair of symmetric angled burner elements 20 on either side of the central burner element 20 to produce flames 122a and 122b directed to an area between solid charge 105 in the center of the furnace 100 and the furnace walls 108, and an upper burner element 20 positioned above the central burner element 20 and angled to direct a flame 134 over the top of solid charge 105 in the furnace 100. This burner 11 can be operated in any of the modes discussed above, with any combination of one, two, or three burner elements 20 active at any one time, and the other burner elements 20 passive.

FIGS. 17A-17C show three modes of operation of a burner 11 having burner elements 20 at different angles with respect to the charge. One such exemplary burner is shown in FIG. 5C(d), in which an upper burner element 20 is oriented to produce a flame 212a that stays in the head space above the charge 104 while a lower burner element 20 is oriented to produce a flame 212b that angles downward to impinge on the charge 104, and specifically to impinge on any remaining solid charge 115 that may collect near the charge door 102. Other burner configurations, including those of FIGS. 5B(a)-5B(f) and 5C(a)-5C(c) can be configured to operate in theses modes also. Such a burner 11 can be operated in three modes: Mode 4A in which the upper burner element 20 is active to produce the flame 212a, Mode 4B in which the lower burner element 20 is active to produce the flame 212b, and Mode 4C in which both the upper and lower burner elements 20 are active (and in which the burner 11 has at least one other burner element 20 that is passive) to produce both flames 212a and 212b. Mode A may be used to deliver energy to the furnace generally, and in particular to the molten bath, and Mode B may be used to deliver extra energy any solid scrap positioned near the charge door, while Mode C combines the features of Modes A and B.

The selective staged burner 10 or non-staged burner 11 may include a combination of two or more burner elements 20 either co-located (in one or more housings) or positioned at different locations (in two or more separate housings) in the furnace 100 and operated in a selective manner as described herein.

The controller 190, 105 is configured and programmed to synchronize the selective active/passive firing of the respective burner elements 20 in the burner 11 based on the input from one or more sensors configured to detect one or more process parameters in the furnace. Those process parameters may including, without limitation and in any combination, charge door temperature, flue gas temperature, flue gas composition, or other flue gas properties such as optical properties, furnace backs temperature (in rear portion of the furnace), furnace wall temperature either internal, embedded, or external, elapsed time since start of batch melting process, oxidant and/or fuel supply pressure, and the change over time of any of the foregoing parameters.

Depending on the process parameters, the controller 105 sets or maintains in an active mode one or more burner elements 20, and sets or maintains in a passive mode the one or more burner elements 20. More specifically, as discussed above, the flow rate of the proportionally distributed reactant, the second fluid F2, remains constant in the annular nozzle 24 of each burner element 20 while the flow rate of the selectively distributed reactant, the first fluid F1, is modulated to a higher active flow rate through the distribution nozzle 22 of the at least one burner element 20 designated as active and is modulated to a lower passive flow rate through the distribution nozzle 22 of the at least one burner element 20 designated as passive. The controller conducts this routine iteratively, so that as process change, the burner elements 20 can be switched in response, so that in some cases previously passive burner elements 20 become active and previously active burner elements 20 become passive. Note, however, that in some process conditions one or more burner elements 20 may remain active continuously and/or one or more burner elements 20 may remain passive continuously.

In one embodiment of the burner 10 or 11, the first fluid F1 is fuel and the second fluid F2 is oxidant. Preferably the oxidant is at least 26% molecular oxygen, at least 40% molecular oxygen, at least 70% molecular oxygen, at least 98% molecular oxygen, or is commercial pure oxygen. Therefore, each of the burner elements 20 that are in active mode operate fuel-rich (i.e., an equivalence ratio greater than 1 and up to about 10) while each of the burner elements 20 that are in passive mode operate fuel-lean (i.e., an equivalence ratio less than 1 and down to about 0.2).

As discussed above, a selective burner operation strategy including cycling the burner through various different modes which may be based on either a pre-determined frequency, or a time-weighted rotation based on the needs of the furnace determined either manually (e.g., by a furnace operator) or in an automated manner through strategically-located sensors detecting the energy distribution needs of the furnace.

Detection and Control is a key aspect of successful implementation and realization of benefits of the selective burner in a melting process in a rotary furnace.

Figure 18:
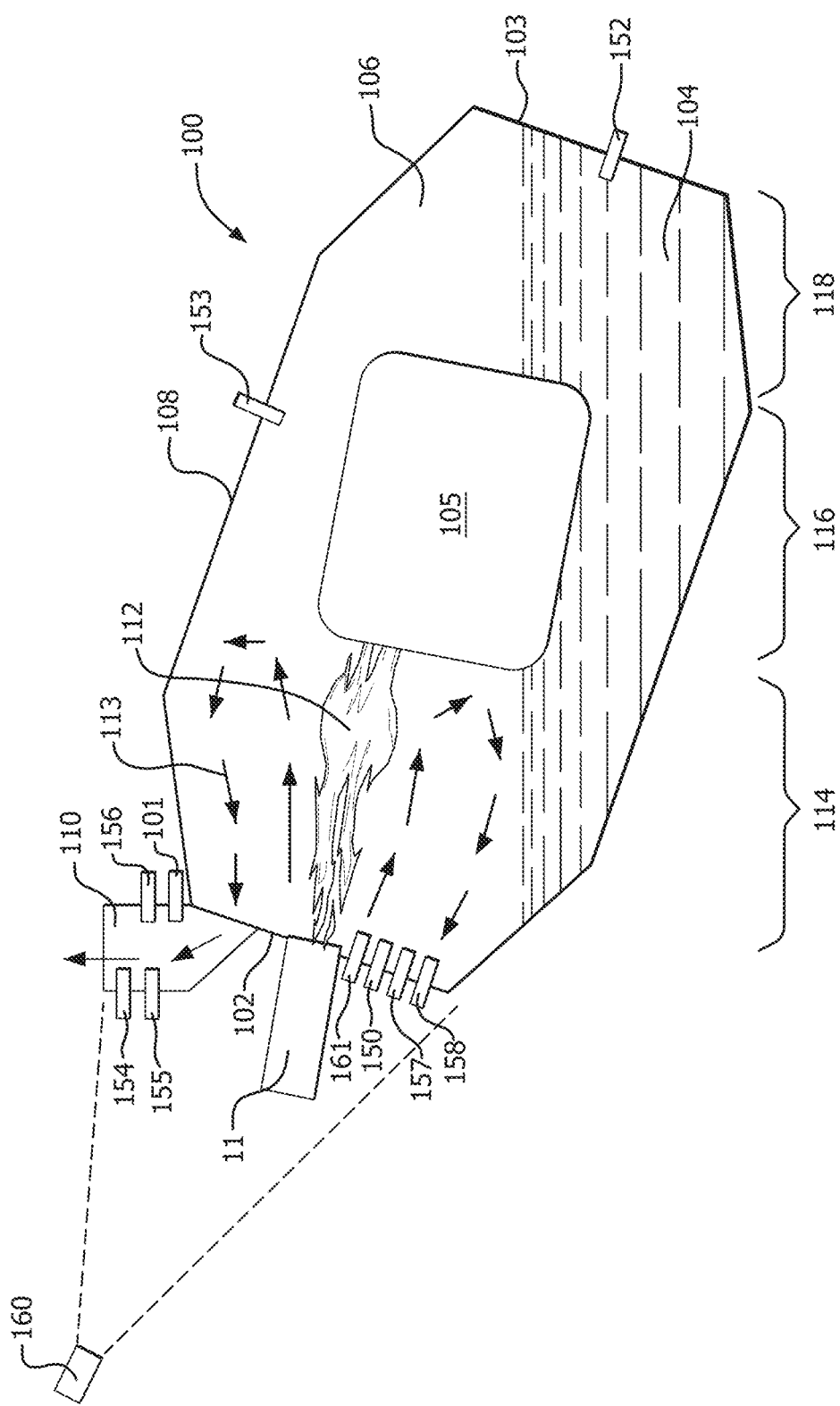
FIG. 18 is a cutaway side view of a double-pass rotary furnace with an embodiment of a selective burner mounted in the charge door, and showing various sensors that may be used, separately or in combination, to control the operation of the burner.

Various detection methods and sensors may be employed, as shown for example in FIG. 18. While several different sensors are shown, any of them can be used by the controller 105 separately or in combination with other sensors to decide how to temporally and spatially weight the operation of the various burner elements. The sensors may include one or more of the following: (a) one or more temperature sensors 150, such as thermocouples or non-contact or optical sensors (e.g., UV and/or IR sensors) installed in the charge door 102, which may be used to detect elevated temperatures in the front portion 114 of the furnace an indication of solids in furnace impeding flame development; (b) one or more temperature sensors 154, such as thermocouples or non-contact or optical sensors (e.g., UV and/or IR sensors) installed in the flue gas duct 110, which may be used to detect elevated temperatures of the flue gas as an indication of solids in furnace impeding flame development; (c) one or more temperature sensors 160, and in particular non-contact or optical sensors, positioned external to the furnace for detecting elevated temperatures of the charge door 102 and/or flue gas duct 110; (d) one or more temperature sensors 152, 153, such as thermocouples or non-contact or optical sensors located on, embedded in, or extending through the furnace walls 108 or charge door 102 or back end wall 103, for detecting temperatures in various parts of the furnace, enabling detection of temperature gradients and non-uniformities; (e) one or more exhaust property sensors 155 in the flue gas duct 110 for measuring exhaust gas properties such as composition as an indication of incomplete combustion; (f) one or more optical sensors 156 in the flue gas duct for detecting optical properties of the flue gas; (g) one or more optical sensors 157 in a furnace wall 108 for detecting optical properties of the furnace gas; (h) one or more proximity sensors 158 in the charge door 102 for detecting solid scrap 105 in the furnace 100; (i) a drum current sensor (not shown) for detecting the motor current required to rotate the furnace 100 about its axis, with higher drum currents indicating the presence of solids and lower drum currents indicating that the charge is fully molten; and (j) one or more pressure transducers 161 in the charge door 102 or the flue gas duct 110, with pressure fluctuations indicating greater combustion instability.

In one embodiment, one or more thermocouples may be installed on the door of the furnace, separately or in combination with one or more emission (IR/UV) sensors to detect a temperature of one or more of the door and an outside wall or portion of the furnace or the flue gas duct (with a full view of the door of the furnace). These temperature sensors will enable detection of flame deflection, and consequently, incomplete combustion, that may be caused by solid scrap or charge in the furnace blocking the full development of the flame. When the temperature of the door rises up above a pre-determined threshold and/or when flames are detected by the emissions sensors, it can be construed that flames are short circuiting in the furnace and preventative action can be initiated. These actions include switching one or more burner elements directing a flame into the solid scrap from passive to active, while switching one or more burner elements directing a flame around the solid scrap from passive to active (or maintaining such a burner element as active).

In addition, or alternatively, an optical (IR) pyrometer and/or video or image capturing device may be installed in the door of the furnace to detect solids within the furnace and preferentially (time weighted) direct energy towards the solids to enhance heat transfer and enable speedier melting. In response, one or more burner elements directing a flame into the solid scrap can be switched from passive to active (or maintained as passive), while one or more burner elements directing a flame around the solid scrap can be switched from passive to active (or maintained as active).

Control can also be based on the state of the melting cycle. At the top end or initial portion of the melting cycle, when flames come out from around the charge door or combustion occurs in the flue gas (first hour or two depending on the load and overall cycle length), it is typically indicative of one of two phenomenon. First, the presence of oils or other flammable or volatile organic material in the solid charge (scrap) results in sub-stoichiometric (fuel-rich) combustion, as those organic materials burn off and consume oxidant supplied via the burner. Second, incomplete combustion caused by limited penetration of flames into the furnace results in short-circuiting of oxidant and fuel and combustion products as those gases are deflection off larger sized scrap in the furnace that has yet to melt. The top end of the melting cycle typically occurs during the first 1-2 hours of the melt cycle, depending on the load and overall cycle length.

The conditions associate with the top end of the melting cycle can be detected based on cycle time, or manually based on operator observations, or with the help of various sensors. When there is presence of organic components or flammables, the methodology set forth in U.S. patent application Ser. No. 13/888,719, published as US Patent Pub. No. 2013/0307202, can be used to post combust those flammables within the confines of the furnace. When the scrap charged is not oily or does not include other organics or flammables, detected flames and resulting temperature increases can be attributed to incomplete combustion and short circuiting of the flames impingement onto large scrap located in the furnace. In this scenario, a combination of flames (one or more) can be operated simultaneously and/or sequentially, as discussed above, to minimize short circuiting of flows and (average) intensity flames around the door/flue gas duct.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A selective oxy-fuel burner for mounting in a charge door of a rotary furnace, the burner comprising:
   at least two burner elements each oriented to fire into different portions of the furnace, each burner element comprising:
   a selective distribution nozzle configured to flow a first reactant; and
   a proportional distribution nozzle configured to flow a second reactant;
   at least one sensor to detect one or more process parameters related to furnace operation; and
   a controller programmed to independently control the first reactant flow to each selective distribution nozzle based at least in part on the detected process parameters such that at least one burner element is active and at least one burner element is passive, wherein the first reactant flow in the selective distribution nozzle of an active burner element is greater than an average first reactant flow to the selective distribution nozzles and the first reactant flow in the selective distribution nozzle of a passive burner element is less than the average first reactant flow to the selective distribution nozzles;

wherein the second reactant is substantially proportionally distributed to the proportional distribution nozzles; and wherein the first reactant is one of a fuel and an oxidant and wherein the second reactant is the other of a fuel and an oxidant.

2. The burner of claim 1, wherein one of the least two burner elements has a flame axis substantially perpendicular to the charge door and another of the at least two burner elements has a flame axis at a non-zero angle, $\alpha$, from perpendicular with respect to the charge door; wherein the angle $\alpha$ is equal to or less than about 75°.

3. The burner of claim 1, wherein the at least one sensor includes an overheating sensor for detecting overheating of the charge door, wherein when overheating is detected, at least one currently active burner element is switched to passive while at least one burner element remains or is switched to active.

4. The burner of claim 1, wherein the at least one sensor includes exhaust property sensor for detecting changes in one or more exhaust properties, wherein when the exhaust property indicates incomplete combustion, at least one currently active burner element is switched to passive while at least one burner element remains or is switched from passive to active.

5. The burner of claim 1, wherein the at least one sensor includes an overheating sensor for detecting overheating of the charge door and an exhaust property sensor for detecting changes in one or more exhaust properties, wherein overheating is detected and the exhaust property indicates incomplete combustion, at least one currently active burner element is switched to passive while at least one burner element remains or is switched from passive to active.

6. The burner of claim 1, wherein the at least one sensor includes a non-contact sensor for detecting the presence of solid charge impeding flame development in the furnace, wherein solid charge is present in the furnace, at least one currently active burner element is switched to passive while at least one burner element remains or is switched from passive to active.

7. The burner of claim 1, wherein in each burner element the proportional distribution nozzle is annular and surrounds the selective distribution nozzle.

8. The burner of claim 1, further comprising:
at least one staging nozzle spaced apart from each of the burner elements and configured to flow a secondary second reactant;
wherein the controller is further programmed to control a staging ratio to be less than or equal to about 75%, wherein the staging ratio is the ratio of the second reactant contained in the secondary second reactant flow to the total flow of second reactant.

9. A rotary furnace comprising:
a charge door and an exhaust port located at one end of the furnace; and an oxy-fuel burner mounted in the charge door, the burner comprising:
at least two burner elements each oriented to fire into different portions of the furnace, each burner element comprising:
a selective distribution nozzle configured to flow a first reactant; and
an proportional distribution nozzle configured to flow an oxidant;
at least one sensor to detect one or more process parameters in the furnace; and
a controller programmed to independently control the first reactant flow to each selective distribution nozzle based at least on part on the detected process parameters such that at least one burner element is active and at least one burner element is passive, wherein the first reactant flow in the selective distribution nozzle of an active burner element is greater than an average first reactant flow to the selective distribution nozzles and first reactant flow in the selective distribution nozzle of a passive burner element is less than the average first reactant flow to the selective distribution nozzles;

wherein the second reactant is substantially proportionally distributed to the proportional distribution nozzles; and wherein the first reactant is one of a fuel and an oxidant and wherein the second reactant is the other of a fuel and an oxidant.

10. A method of operating a rotary furnace as in claim 9, the method comprising:
detecting one or more process parameters in the furnace;
selecting, based at least in part on the detected process parameters, at least one of the burner elements to be active and at least one of the burner elements to be passive;
flowing a first reactant at an active jet flow rate through the selective distribution nozzle of the at least one active burner element;
flowing the first reactant at a passive jet flow rate through the selective distribution nozzle of the at least one passive burner element; and
flowing a second reactant substantially proportionally through each of the proportional distribution nozzles;
wherein the active jet flow rate is greater than an average flow rate through the selective distribution nozzles and the passive jet flow rate is less than the average flow rate through the selective distribution nozzles; and
wherein the first reactant is one of a fuel and an oxidant and wherein the second reactant is the other of a fuel and an oxidant.

11. The method of claim 10, further comprising:
detecting overheating of the charge door; and
when overheating is detected, switching at least one currently active burner element to passive while maintaining as active or switching to active at least one other burner element.

12. The method of claim 10, further comprising:
detecting at least one exhaust property;
when the exhaust property indicates incomplete combustion, switching at least one currently active burner element to passive while maintaining as active or switching to active at least one other burner element.

13. The method of claim 10, further comprising:
detecting when the at least one currently active burner element is discharging a flame that impinges solid charge in the furnace; and
switching said at least one currently active burner element to passive while maintaining as active or switching to active at least one other burner element.

14. The method of claim 10, wherein the ratio of the active jet flow rate to the passive jet flow rate is from about 5 to about 40.

15. The method of claim 10, wherein a passive burner element has an equivalence ratio of from about 0.2 to about 1, and wherein an active burner element has an equivalence ratio of from about 1 to about 10, wherein the equivalence ratio is the ratio of theoretical stoichiometric oxidant flow to actual oxidant flow through one of the distribution nozzles to combust the fuel flowing through the other of the distribution nozzles.

* * * * *